(12) United States Patent
Mackin et al.

(10) Patent No.: US 11,524,764 B2
(45) Date of Patent: *Dec. 13, 2022

(54) AERODYNAMIC BRAKE AND METHOD OF AERODYNAMICALLY BRAKING A VEHICLE

(71) Applicant: The Boeing Company, Chicago, IL (US)

(72) Inventors: Steve G. Mackin, Bellevue, WA (US); Lowell B. Campbell, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 3 days.

This patent is subject to a terminal disclaimer.

(21) Appl. No.: 17/239,577

(22) Filed: Apr. 24, 2021

(65) Prior Publication Data

US 2021/0237851 A1    Aug. 5, 2021

Related U.S. Application Data

(63) Continuation of application No. 16/278,450, filed on Feb. 18, 2019, now Pat. No. 11,014,646.

(51) Int. Cl.
*B64C 9/32* (2006.01)
*B64C 13/40* (2006.01)

(52) U.S. Cl.
CPC .............. *B64C 9/323* (2013.01); *B64C 13/40* (2013.01)

(58) Field of Classification Search
CPC .. B64C 9/32; B64C 9/323; B64C 9/34; B64C 9/58
See application file for complete search history.

(56) References Cited

U.S. PATENT DOCUMENTS

| 1,500,184 | A | * | 7/1924 | Ellsdorf | B64C 9/323 244/113 |
| 1,845,960 | A | * | 2/1932 | Daniell | B64C 9/323 244/113 |
| 2,041,688 | A | * | 5/1936 | Barnhart | B64C 9/32 244/113 |

(Continued)

FOREIGN PATENT DOCUMENTS

FR    875200    9/1942

OTHER PUBLICATIONS

EPO, European Search Report, Appl. No. 120156030.7, dated Jul. 1, 2020.

*Primary Examiner* — Richard G Davis

(57) ABSTRACT

An aerodynamic brake includes a rigid panel having a panel leading edge portion and a panel trailing edge portion. The aerodynamic brake also includes a flexible sheet having a sheet lower edge portion coupled to the vehicle body, and a sheet upper edge portion coupled to the panel leading edge portion. The aerodynamic brake further includes a panel actuator configured to move the rigid panel between a stowed position and a deployed position. In the stowed position, the rigid panel is located proximate the vehicle body and covers the flexible sheet in a folded state. In the deployed position, the panel leading edge portion is moved away from the vehicle body and the flexible sheet is in an open state exposable to an oncoming airflow for generating aerodynamic drag for slowing the vehicle.

20 Claims, 20 Drawing Sheets

(56) References Cited

U.S. PATENT DOCUMENTS

| | | | | |
|---|---|---|---|---|
| 2,418,273 A | * | 4/1947 | Moore | B64C 13/00 |
| | | | | 244/113 |
| 2,428,936 A | * | 10/1947 | Hunter | B64C 9/323 |
| | | | | 244/113 |
| 2011/0272532 A1 | | 11/2011 | Matsuda | |
| 2020/0189725 A1 | | 6/2020 | Jasklowski | |

* cited by examiner

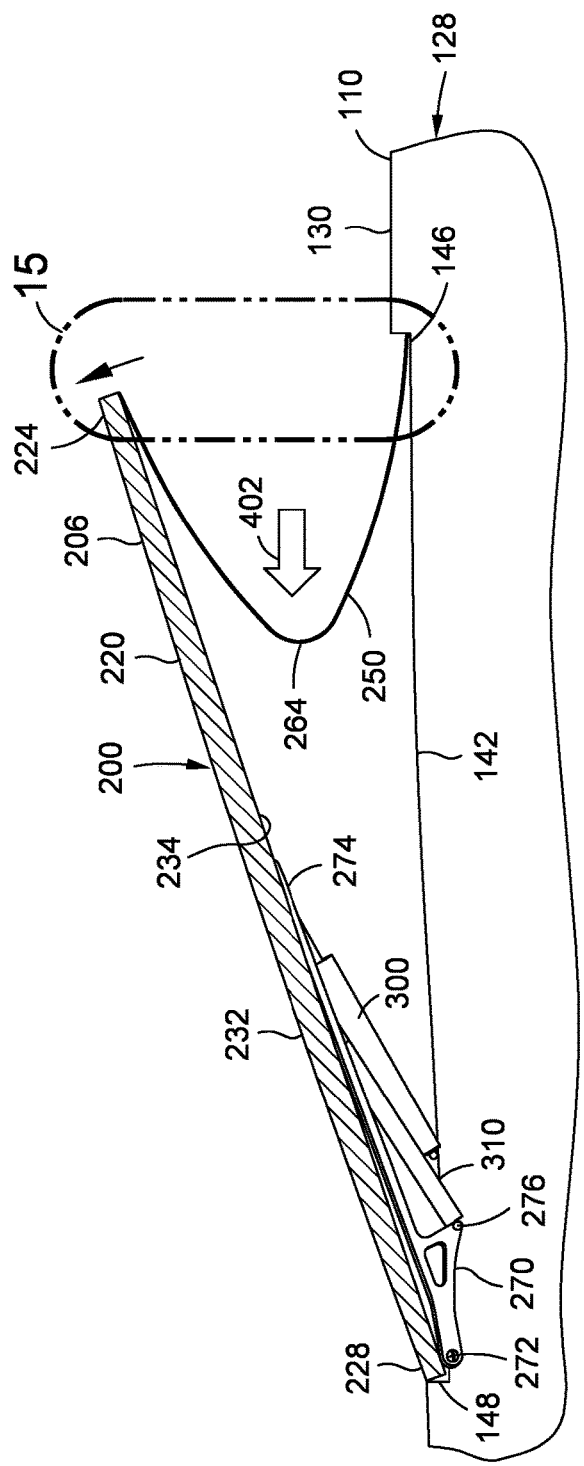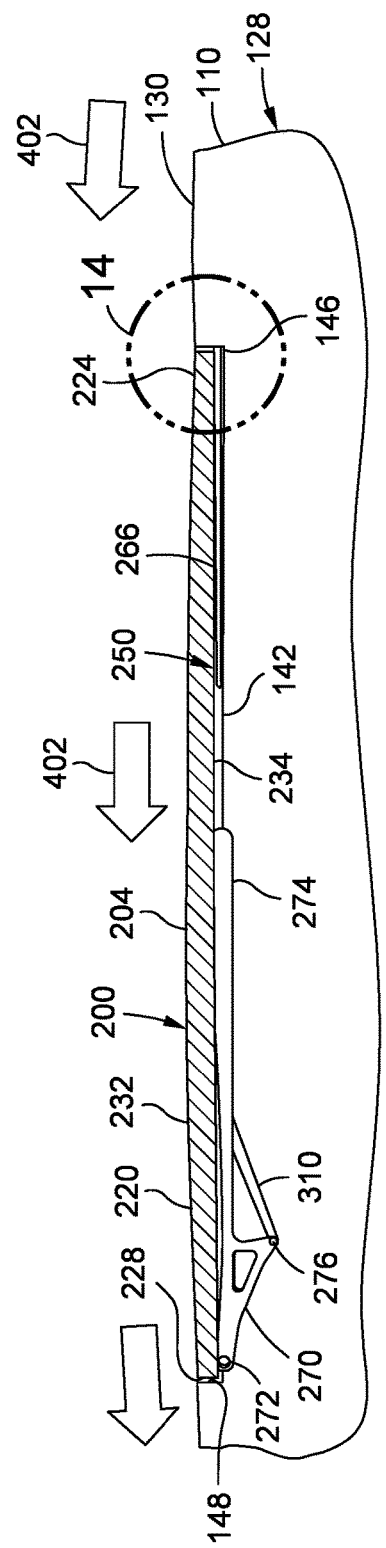
FIG. 11
FIG. 10

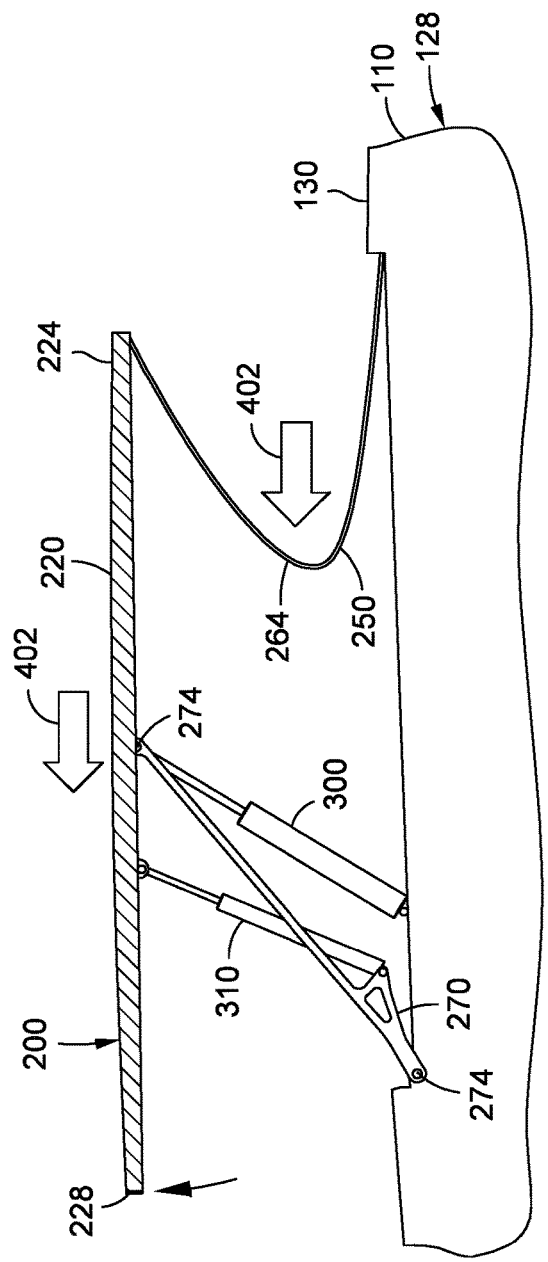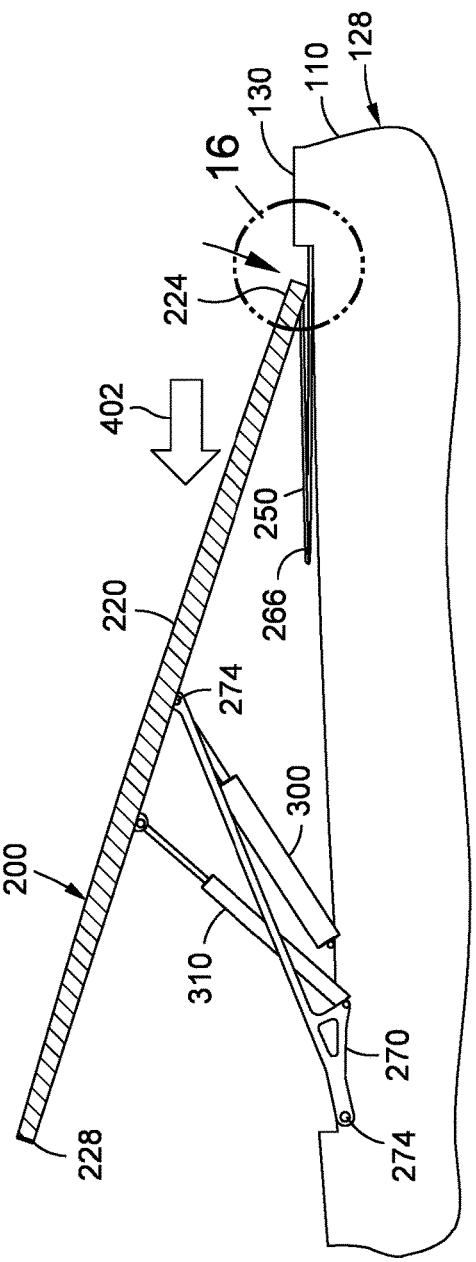
FIG. 12
FIG. 13

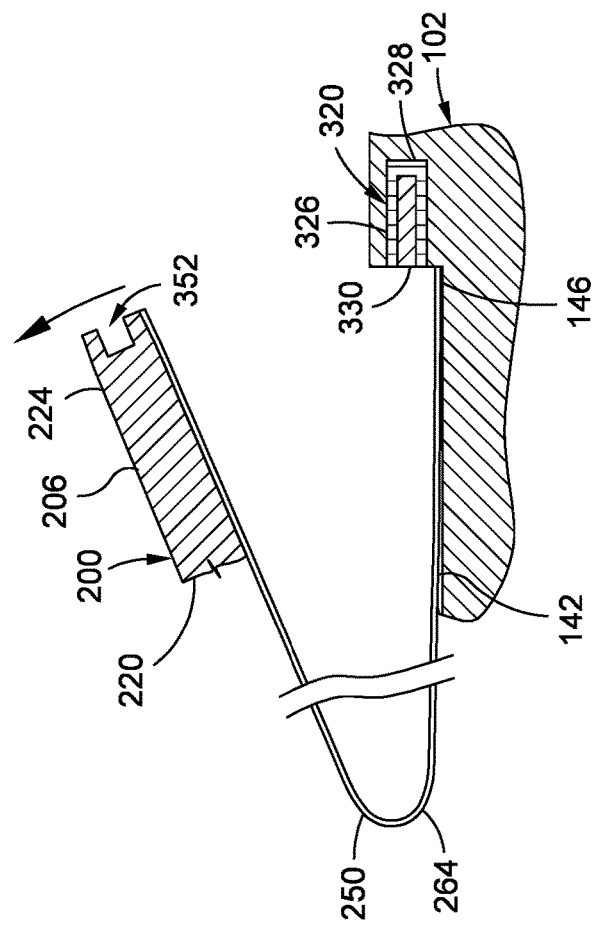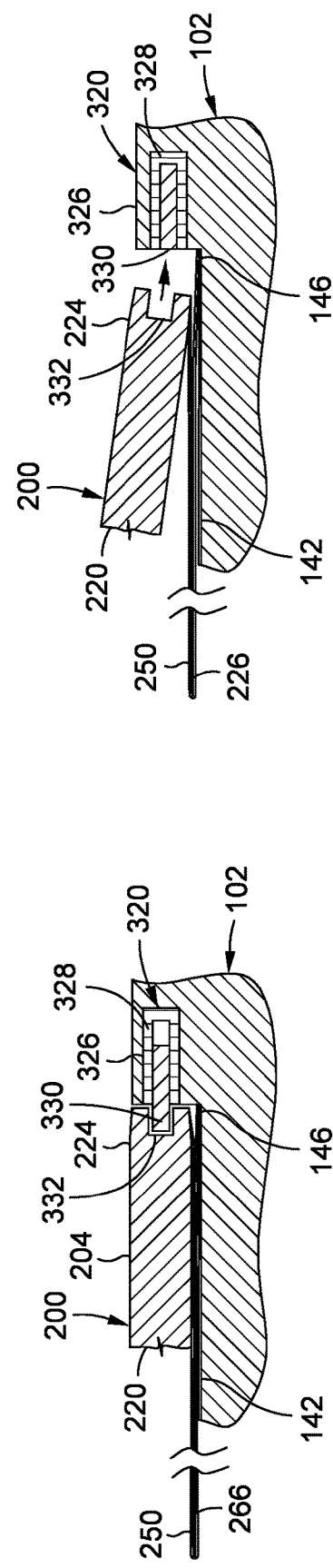
FIG. 15
FIG. 16
FIG. 14

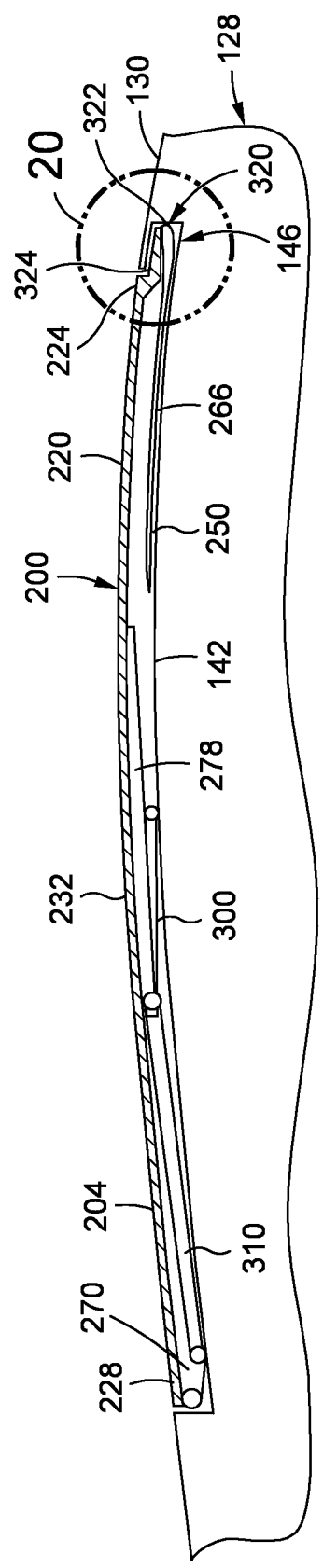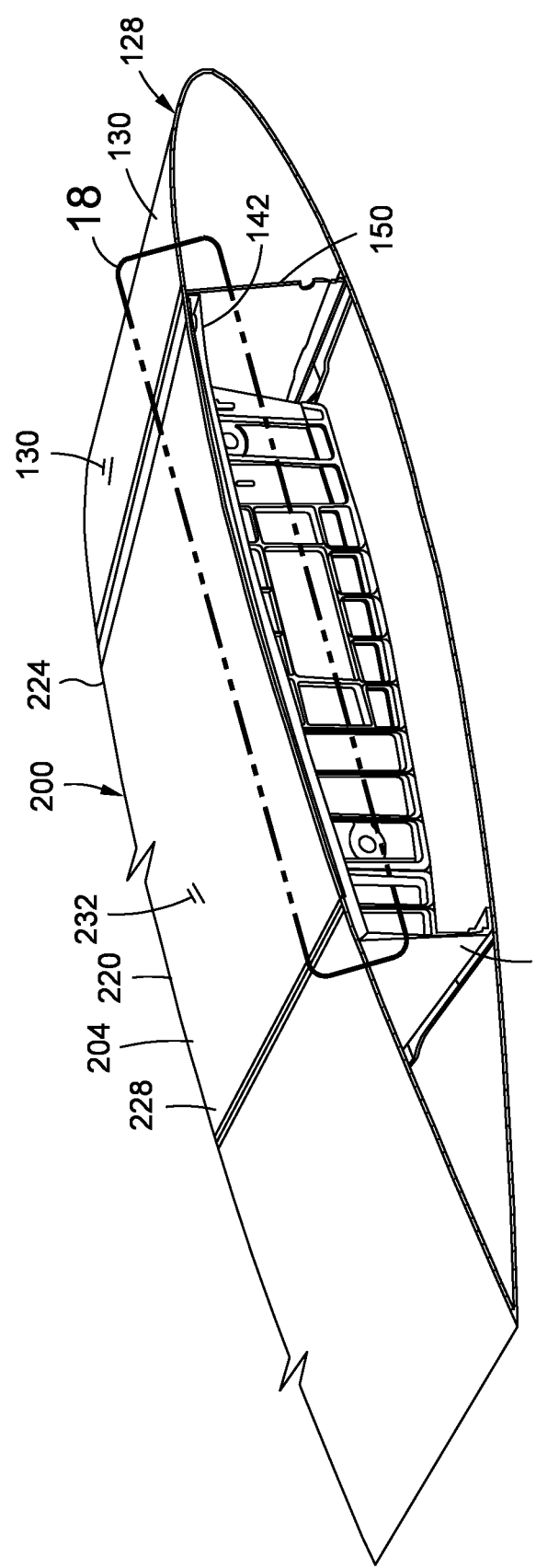
FIG. 18
FIG. 17

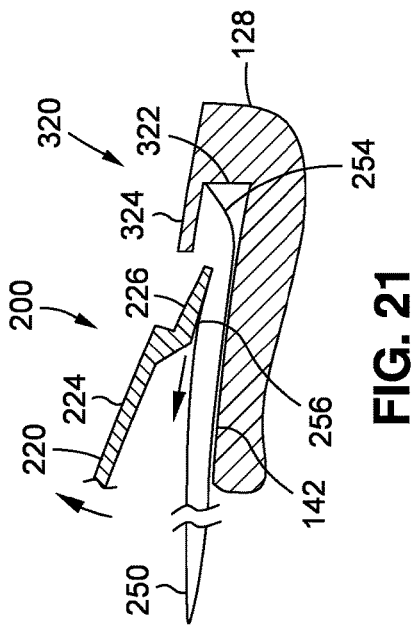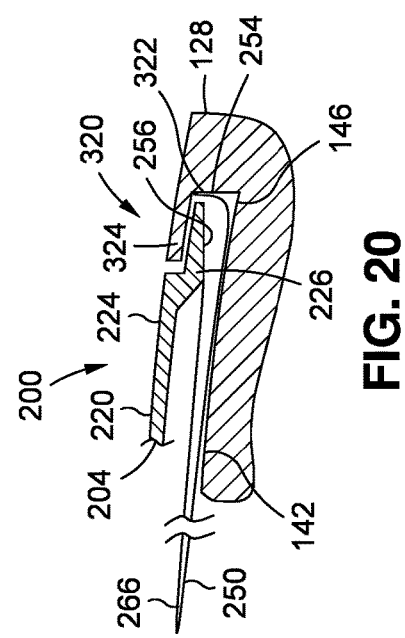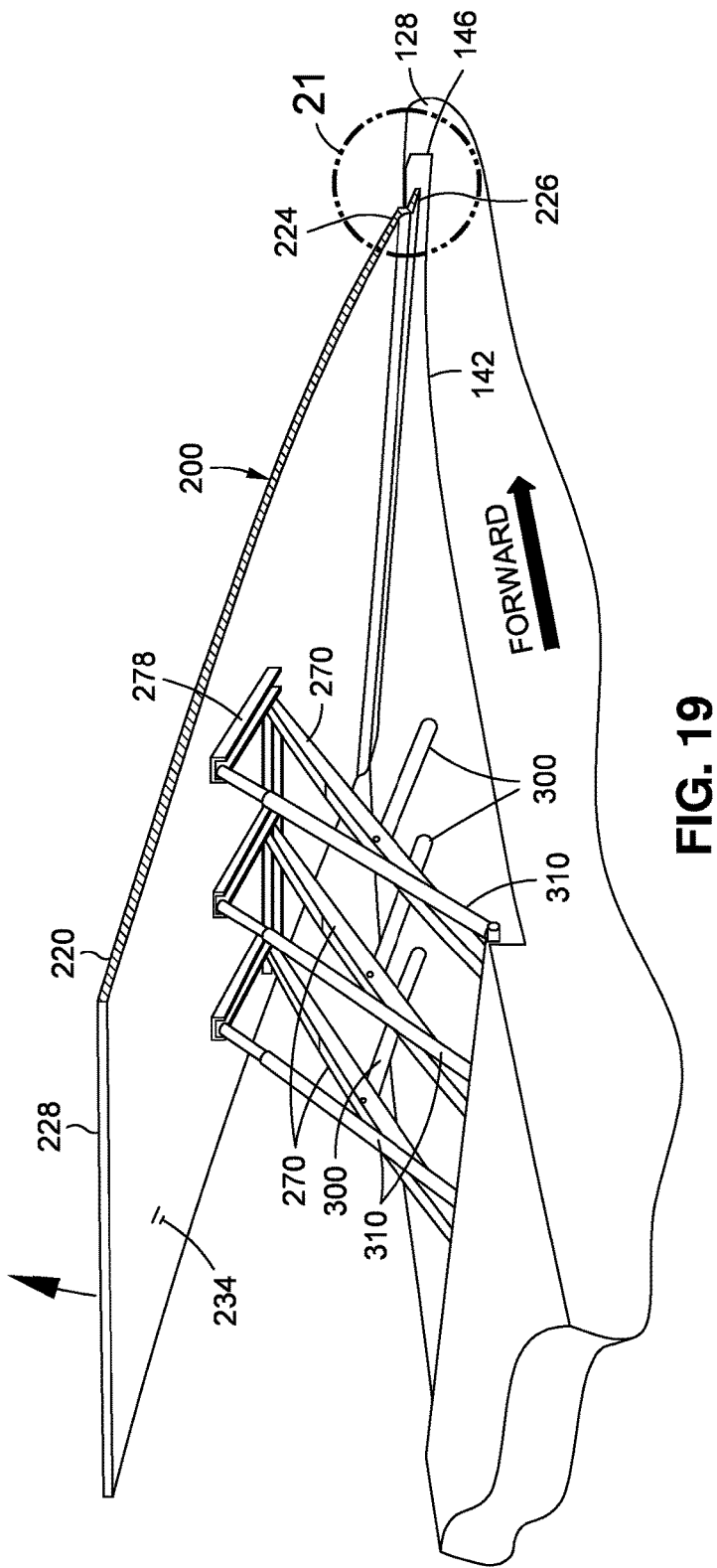

AERODYNAMIC BRAKE AND METHOD OF AERODYNAMICALLY BRAKING A VEHICLE

CROSS-REFERENCE TO RELATED APPLICATIONS

The present application is a continuation of and claims priority to pending U.S. application Ser. No. 16/278,450 filed on Feb. 18, 2019, and entitled AERODYNAMIC BRAKE SYSTEM AND METHOD, the entire contents of which is expressly incorporated by reference herein.

FIELD

The present disclosure relates generally to aircraft and, more particularly, to a system and method for aerodynamically braking an aircraft.

BACKGROUND

Aircraft typically include one or more mechanisms for slowing the aircraft during landing. For example, many aircraft include wheel brakes on the landing gear wheels. An aircraft with turbine engines may include thrust reversers for deflecting the through-engine airflow out to the sides of the engine to generate drag and slow the aircraft during landing. Unfortunately, thrust reversers are complex mechanical systems that are expensive to manufacture and maintain. On certain types of engines such as those with high bypass ratios, thrust reversers are difficult to design and develop. Thrust reversers also increase the weight of the engine nacelle which reduces aircraft fuel efficiency. In addition, thrust reversers generate noise during landing.

Some aircraft include wing-mounted spoilers that may be deployed to slow the aircraft during landing. Unfortunately, large spoilers are difficult to implement and may impact the available volume for carrying fuel in the wing fuel tanks. Some aircraft include fuselage spoilers mounted on the aft end of the fuselage to increase drag during landing. Unfortunately, fuselage spoilers may require additional load-carrying structure which adds to the aircraft weight. In addition, fuselage spoilers may complicate the installation of the auxiliary power unit which is typically mounted in the aft end of the fuselage.

As can be seen, there exists a need in the art for a system and method for slowing an aircraft that avoids the above-noted challenges associated with existing aircraft.

SUMMARY

The above-noted needs associated with aircraft configurations are specifically addressed and alleviated by the present disclosure which provides an aerodynamic brake for a vehicle. The aerodynamic brake includes at least one rigid panel having a panel leading edge portion and a panel trailing edge portion. The panel trailing edge portion is pivotably coupled to a vehicle body. In addition, the aerodynamic brake includes at least one flexible sheet having a sheet lower edge portion and a sheet upper edge portion. The sheet lower edge portion is coupled to the vehicle body. The sheet upper edge portion is coupled to the panel leading edge portion. The aerodynamic brake further includes at least one panel actuator configured to pivot the rigid panel for moving the rigid panel between a stowed position and a deployed position. In the stowed position, the rigid panel is located proximate the vehicle body and covers the flexible sheet in a folded state between the rigid panel and the vehicle body. In the deployed position, the panel leading edge portion is pivoted away from the vehicle body and the flexible sheet is in an open state exposable to an oncoming airflow relative to a forward-moving direction of the vehicle for generating aerodynamic drag for slowing the vehicle.

Also disclosed is an aircraft having a pair of wings and at least one aerodynamic brake mounted to a wing upper surface of each wing. Each aerodynamic brake includes at least one rigid panel, at least one flexible sheet, and at least one panel actuator. The rigid panel has a panel leading edge portion and a panel trailing edge portion. The panel trailing edge portion is pivotably coupled to a wing. The flexible sheet has a sheet lower edge portion and a sheet upper edge portion. The sheet lower edge portion is coupled to the wing. The sheet upper edge portion is coupled to the panel leading edge portion. The panel actuator is configured to pivot the rigid panel about a location proximate the panel trailing edge portion for moving the aerodynamic brake between a stowed position and a deployed position. In the stowed position, the rigid panel is positioned proximate the wing and covers the flexible sheet in a folded state between the rigid panel and the wing. In the deployed position, the panel leading edge portion is pivoted away from the wing and the flexible sheet is in an open state exposable to an oncoming airflow relative to a forward-moving direction of the aircraft for generating aerodynamic drag for slowing the aircraft.

Also disclosed is method of aerodynamically braking a vehicle. The method includes moving the vehicle along a forward-moving direction causing an oncoming airflow to pass over a vehicle body. In addition, the method includes deploying an aerodynamic brake from the vehicle body by performing the following: pivoting, using a panel actuator, at least one rigid panel from a stowed position to a deployed position. The rigid panel has a panel trailing edge portion that is pivotably coupled to the vehicle body. The rigid panel in the stowed position is located proximate the vehicle body and covers a flexible sheet in a folded state having a sheet lower edge portion coupled to the vehicle body and a sheet upper edge portion coupled to a panel leading edge portion. The rigid panel in the deployed position has the panel leading edge portion pivoted away from the vehicle body. The deployment of the aerodynamic brake further includes transitioning, when pivoting the rigid panel from the stowed position to the deployed position, the flexible sheet from the folded state to an open state exposing the flexible sheet to the oncoming airflow relative to the forward-moving direction of the vehicle. The method additionally includes generating aerodynamic drag in response to deployment of the aerodynamic brake.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 10 is a side sectional view of a portion of a wing of an aircraft showing an example of an aerodynamic brake in the stowed position in which the rigid panel is nested within a recess formed within the wing upper surface;

FIG. 11 is a side sectional view of the wing of FIG. 10 showing the aerodynamic brake transitioning from the stowed position to the deployed position and illustrating a panel actuator and an auxiliary actuator for moving the aerodynamic brake;

FIG. 12 is a side sectional view of the wing of FIG. 10 showing the auxiliary actuator pivoting the rigid panel for moving the panel leading edge portion downwardly to reduce exposure of the flexible sheet to the oncoming airflow;

FIG. 13 is a side sectional view of the wing of FIG. 10 showing the panel actuator and the auxiliary actuator being actuated in a coordinated manner to move the rigid panel into the stowed position;

FIG. 14 is a magnified view of the encircled region of the wing identified by reference numeral 14 of FIG. 10 and illustrating an example of a leading edge portion securing mechanism configured as an axially-movable pin engaged within a bore in the panel leading edge portion for releasably securing the panel leading edge portion of the rigid panel to the vehicle body when the rigid panel is in the stowed position;

FIG. 15 is a magnified view of the encircled region of the wing identified by reference numeral 15 of FIG. 11 and illustrating the rigid panel pivoting toward the deployed position after the release of the panel leading edge portion from the vehicle body;

FIG. 16 is a magnified view of the encircled region of the wing identified by reference numeral 16 of FIG. 13 and illustrating the re-engagement of the panel leading edge portion to the vehicle body as the rigid panel moves into the stowed position;

FIG. 17 is a perspective view of a portion of a wing illustrating a further example of an aerodynamic brake incorporated into the wing between a wing front spar and a wing rear spar;

FIG. 18 is a side view of a portion of the encircled region of the wing identified by reference numeral 18 of FIG. 17 and illustrating the rigid panel nested within a recess formed in the wing upper surface;

FIG. 19 is a perspective view of the portion of the wing of FIG. 17 and illustrating the rigid panel supported on a plurality of mounting brackets and further illustrating a plurality of panel actuators and a plurality of auxiliary actuators operating in a coordinated manner during an initial stage in the movement of the rigid panel from the stowed position to the deployed position;

FIG. 20 is a magnified view of the encircled region of the wing identified by reference numeral 20 of FIG. 18 and illustrating a lip of the panel leading edge portion of the rigid panel releasably secured to the wing by means of an overhang included with the wing for releasably maintaining the rigid panel in the stowed position;

FIG. 21 is a magnified view of the encircled region of the wing identified by reference numeral 21 of FIG. 19 and illustrating the rigid panel being moved by coordinated actuation of the panel actuators and auxiliary actuators to cause a combination of aftward translation of the panel leading edge portion and upward pivoting the panel trailing edge portion to facilitate disengagement of the lip of the panel leading edge portion from the overhang of the wing to allow for pivoting movement of the rigid panel from the stowed position to the deployed position;

DETAILED DESCRIPTION

Figure 1:
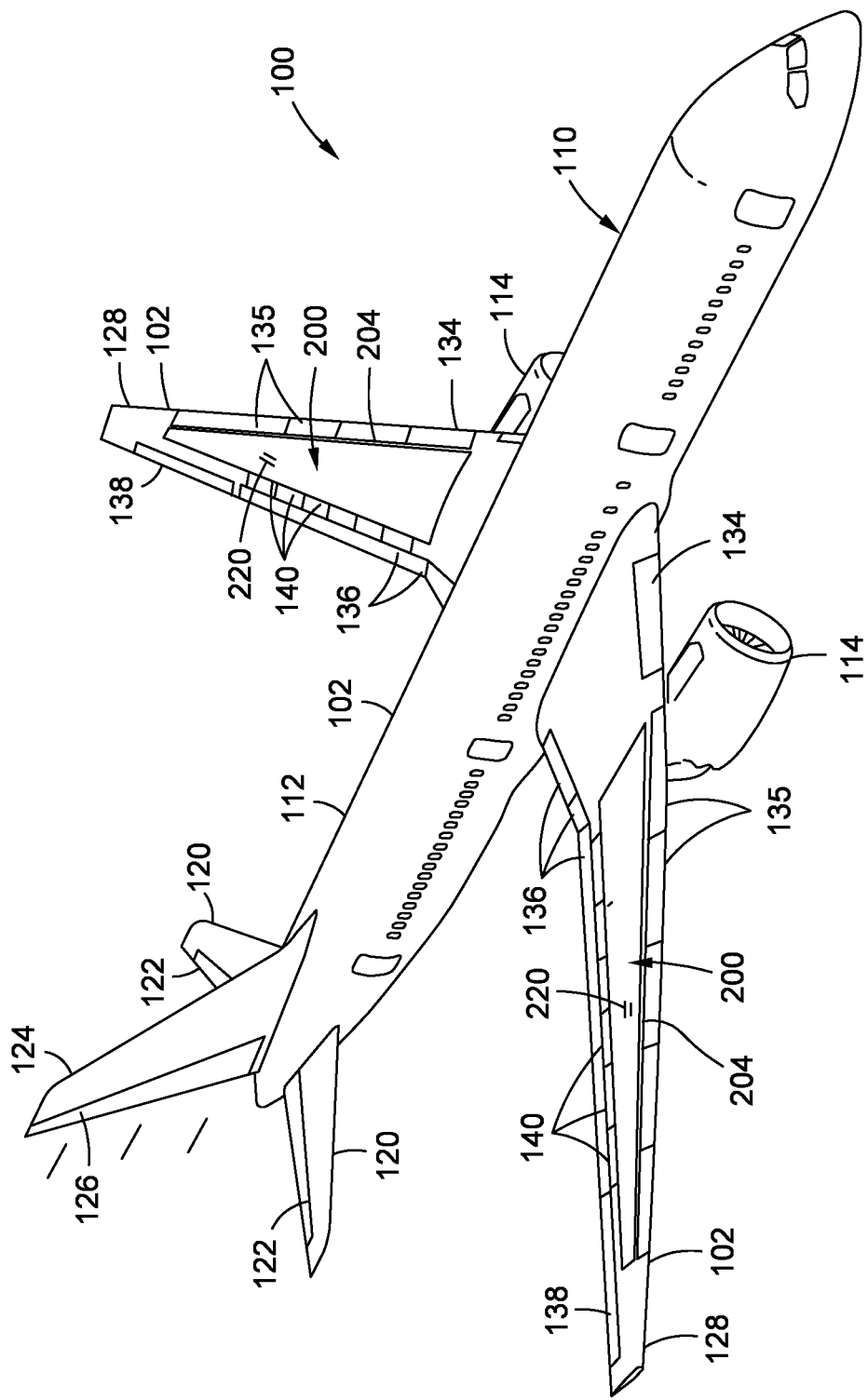
FIG. 1 is a perspective view of an example of an aircraft having an example of an aerodynamic brake (shown in a stowed position) incorporated into each wing.
Figure 2:
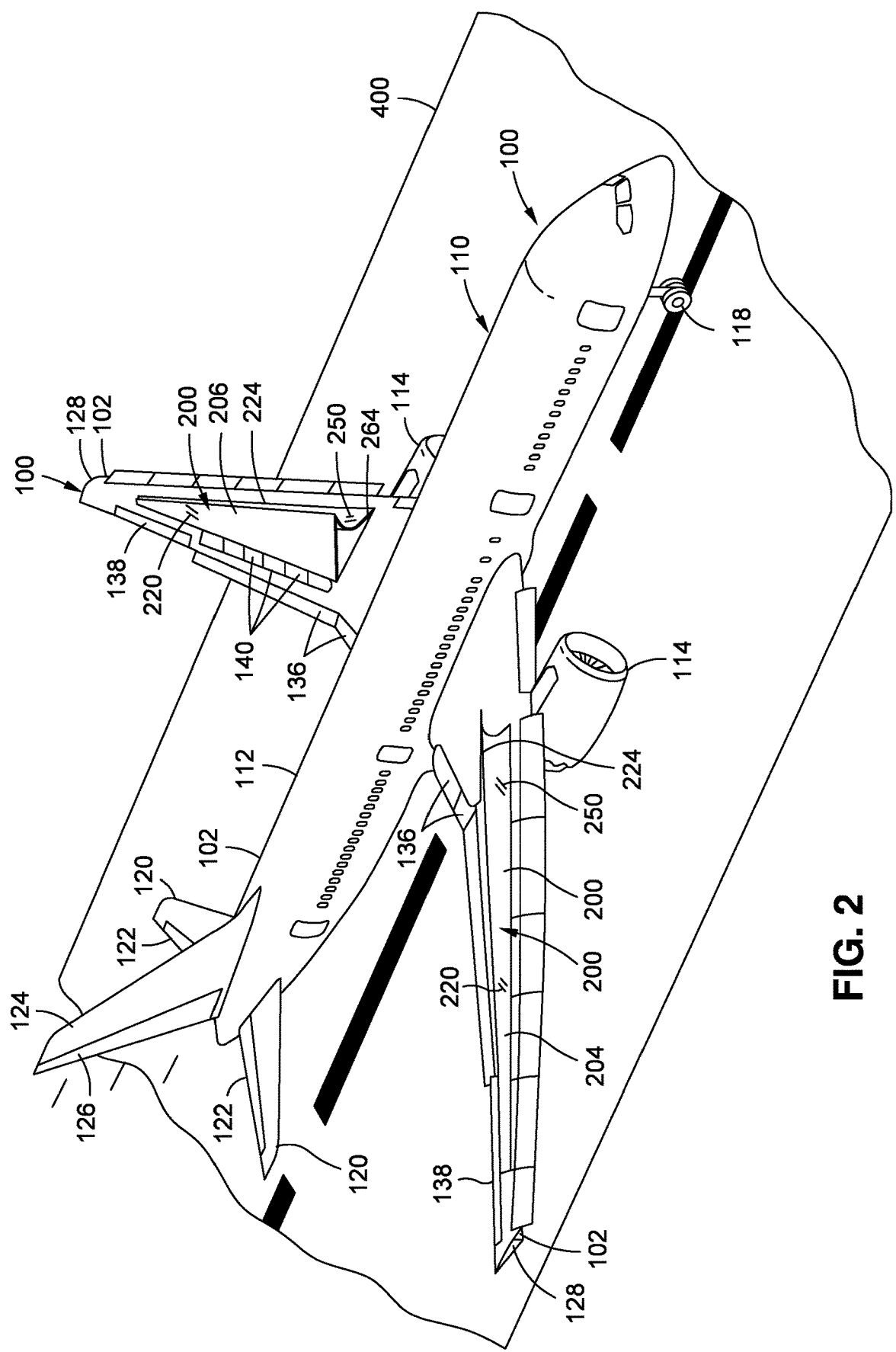
FIG. 2 is a perspective view of the aircraft of FIG. 1 during a landing on a runway and illustrating the aerodynamic brakes in a deployed position in which a rigid panel of each aerodynamic brake is pivoted upwardly causing a flexible sheet of each aerodynamic brake to be extended into an open state exposable to oncoming airflow.

Referring now to the drawings which illustrate various examples of the disclosure, shown in FIG. 1 is a perspective view of an example of an aircraft 110 having an aerodynamic brake 200 in a stowed position 204 on each wing 128 of the aircraft 110. FIG. 2 shows the aircraft 110 of FIG. 1 during a landing on a runway 400 and illustrating the aerodynamic brakes 200 in a deployed position 206 for generating aerodynamic drag for decelerating the aircraft 110 during the landing. The aerodynamic brakes 200 reduce the forward momentum of the aircraft 110 during the landing roll. The aerodynamic brake 200 disclosed herein may obviate the need for thrust reversers on aircraft 110 engines 114. The elimination of thrust reversers from the engines 114 may reduce the cost, complexity and/or weight of the engines 114.

Figure 7:
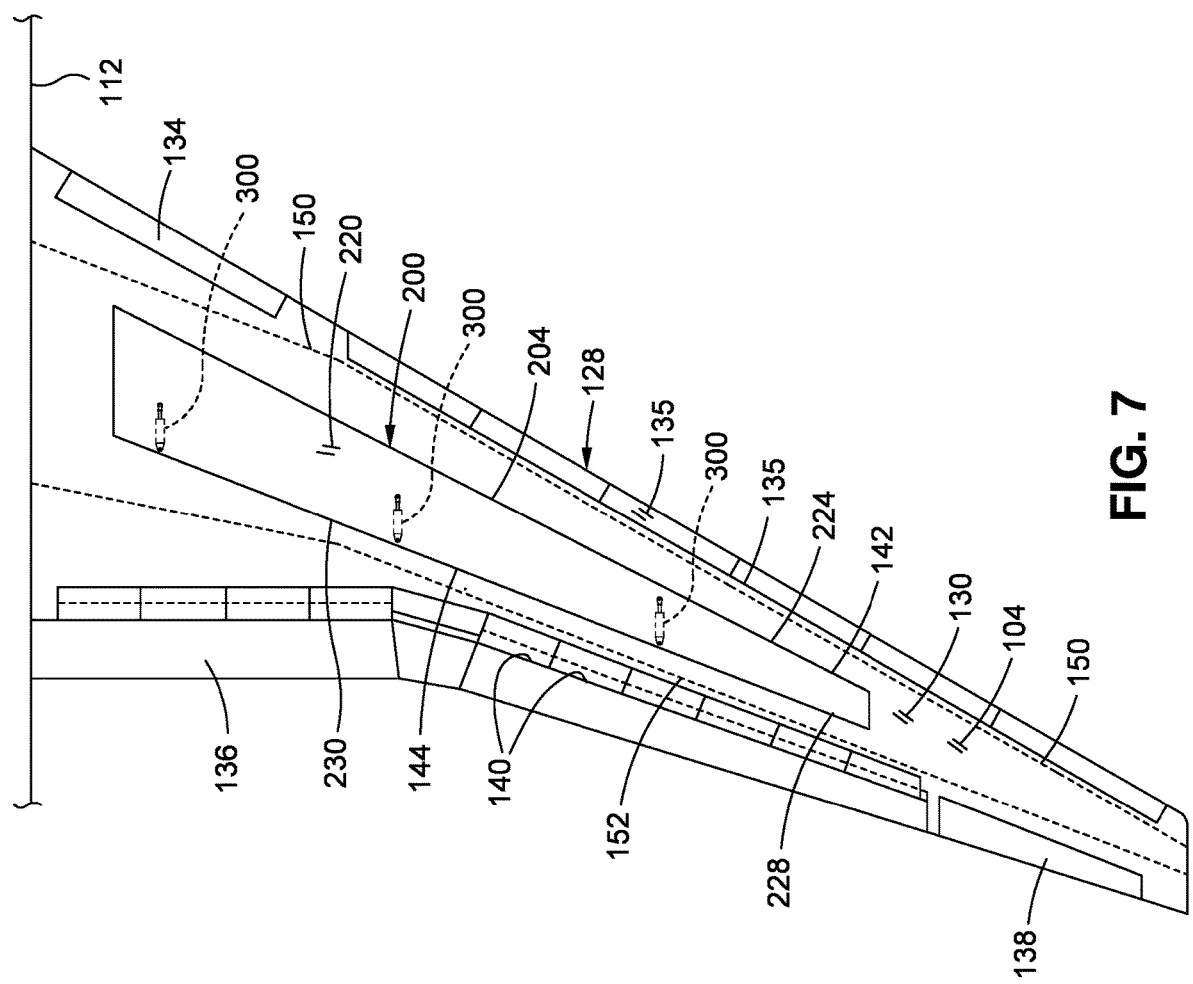
FIG. 7 is a top view of an example of a wing of an aircraft showing an example of the outline geometry and placement of an aerodynamic brake on the wing.

As described in greater detail below, each aerodynamic brake 200 includes at least one rigid panel 220, at least one flexible sheet 250 (FIG. 2), and one or more panel actuators 300 (FIG. 7). Each rigid panel 220 is coupled to a vehicle body 102 of a vehicle 100. In the presently-disclosed examples, the vehicle 100 is an aircraft 110 and the vehicle body 102 is a wing 128 of the aircraft 110. However, as mentioned below, the presently-disclosed aerodynamic brake 200 may be installed on any one of a variety of different types of air vehicles or land vehicles, and is not limited to being installed on a wing 128 of an aircraft 110.

In the example aircraft 110 of FIGS. 1-2, the one or more panel actuators 300 (FIG. 7) of each aerodynamic brake 200 are configured to pivot the rigid panel 220 for moving the aerodynamic brake 200 between the stowed position 204 (FIG. 1) and the deployed position 206 (FIG. 2). In the stowed position 204, each rigid panel 220 is positioned proximate (e.g., against) the vehicle body 102 (e.g., a wing 128) and covers the flexible sheet 250 (FIG. 10) in a folded state 266 (FIG. 10) between the rigid panel 220 and the vehicle body 102. When the aerodynamic brake 200 is moved to the deployed position 206, the panel leading edge portion 224 is pivoted (e.g., upwardly) away from the vehicle body 102 (e.g., the wing) and the flexible sheet 250 transitions from the folded state 266 to an open state 264. In the open state 264, the flexible sheet 250 is exposable to an oncoming airflow 402 (FIG. 8) relative to a forward-moving direction of the vehicle 100 (e.g., aircraft 110) for generating aerodynamic drag for decelerating the vehicle 100.

Figure 4:
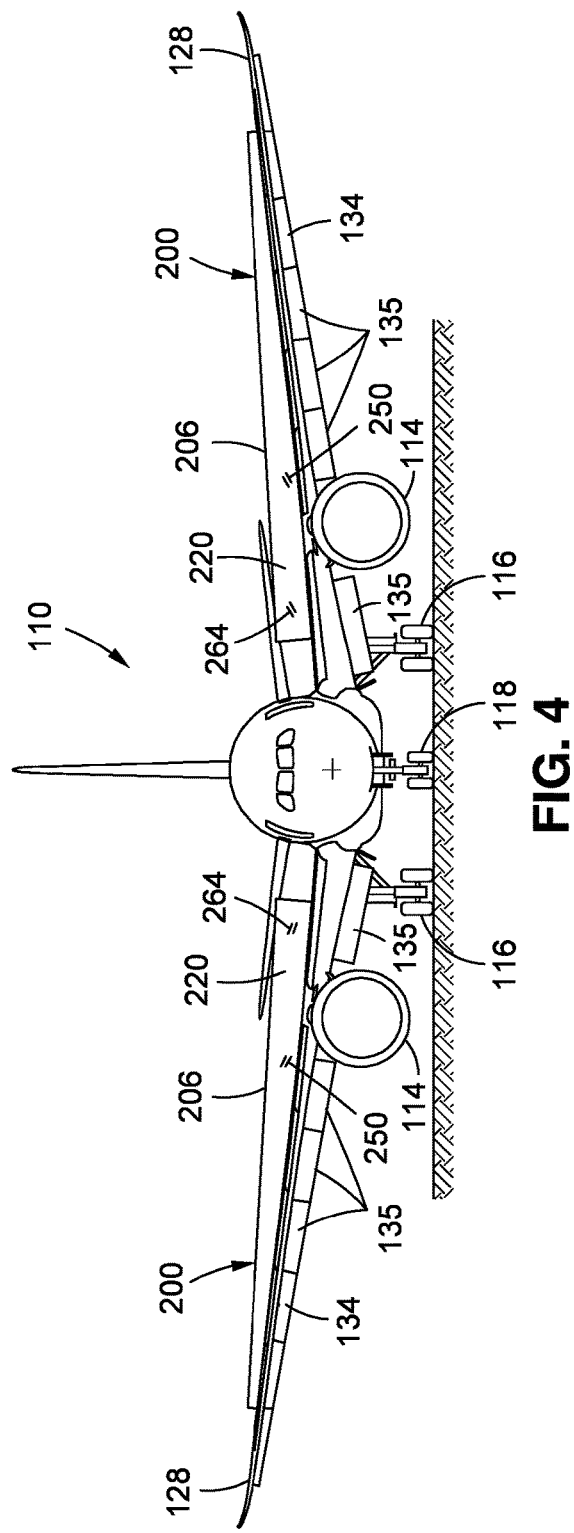
FIG. 4 is a front view of the aircraft of FIG. 2 showing the aerodynamic brake on each wing in the deployed position and illustrating the flexible sheets in the open state.

In FIGS. 1-2, the aircraft 110 includes a fuselage 112 and the pair of wings 128 extending outwardly from the fuselage 112. The engines 114 of the aircraft 110 are shown supported from the wings 128. The aircraft 110 is supported by the main landing gear 116 (FIG. 4) and a nose landing gear 118 (FIG. 4). The aircraft 110 includes a horizontal tail and a vertical tail. The horizontal tail comprises a horizontal stabilizer 120 and elevator 122, and the vertical tail comprises a vertical stabilizer 124 and rudder 126. The wings 128 may include high-lift devices 134 such as leading edge slats 135 or Krueger flaps and/or trailing edge flaps 136. In addition, the wings 128 may include speed brakes or spoilers 140, ailerons 138, and/or other flight control surfaces.

Figure 3:
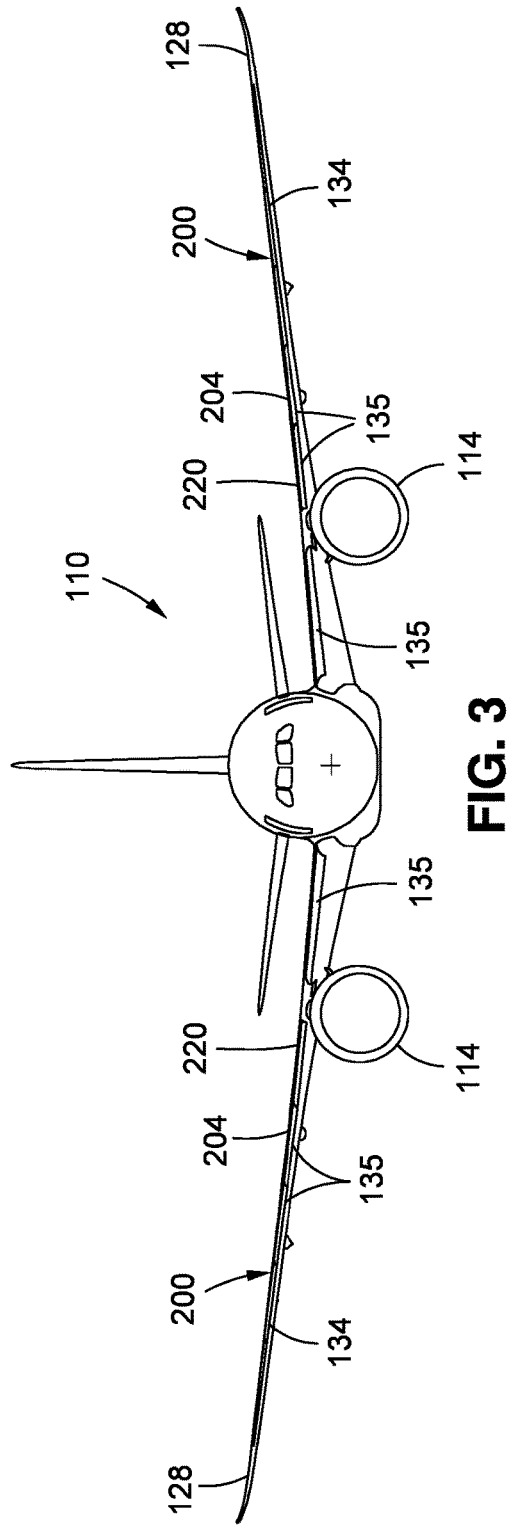
FIG. 3 is a front view of the aircraft of FIG. 1 showing the aerodynamic brake on each wing in the stowed position in which the rigid panel may be substantially flush with the wing upper surface and the flexible sheet may be stowed underneath the rigid panel.
Figure 5:
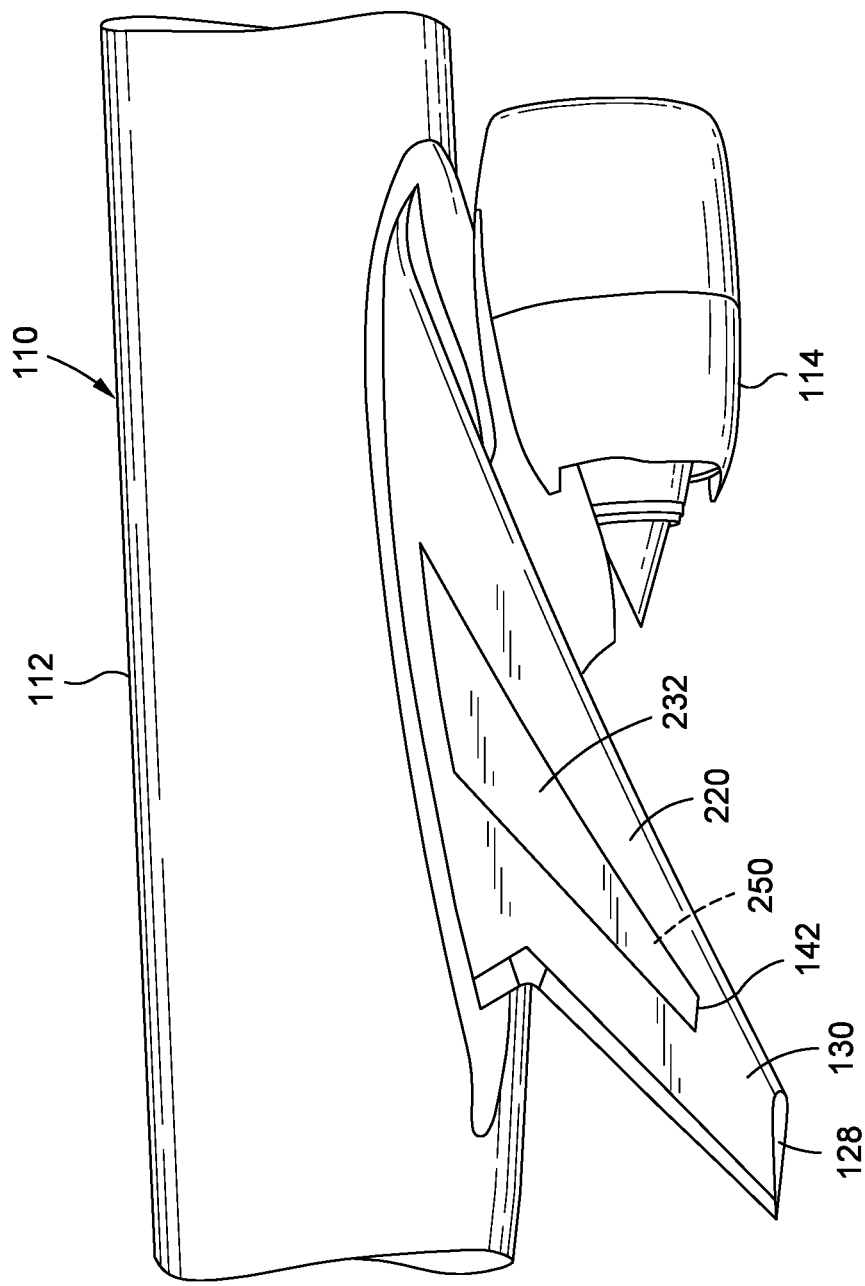
FIG. 5 is a perspective partial view of an aircraft showing the aerodynamic brake on one of the wings in the stowed position.

FIG. 3 is a front view of the aircraft configuration of FIG. 1. In FIG. 3, the aerodynamic brake 200 on each wing 128 is in the stowed position 204. FIG. 5 is a perspective view of the aircraft 110 showing the rigid panel 220 substantially flush with the wing upper surface 130 when rigid panel 220 is in the stowed position 204. As described in greater detail below, the flexible sheet 250 may self-stow underneath the rigid panel 220 when the aerodynamic brake 200 is moved from the deployed position 206 (FIG. 2) to the stowed position 204. Although not shown in FIG. 5, the wing upper surface 130 may include a pocket or recess 142 (FIG. 8) sized and configured to receive the rigid panel 220 in the stowed position 204 such that the panel outer surface 232 is substantially flush with the wing upper surface 130. The aircraft 110 in FIGS. 1, 3 and 5 may be in a cruise flight configuration in which the high-lift devices 134 (e.g., leading edge slats 135 and trailing edge flaps 136—FIG. 5) are substantially retracted and the aerodynamic brakes 200 are in the stowed position 204.

Figure 6:
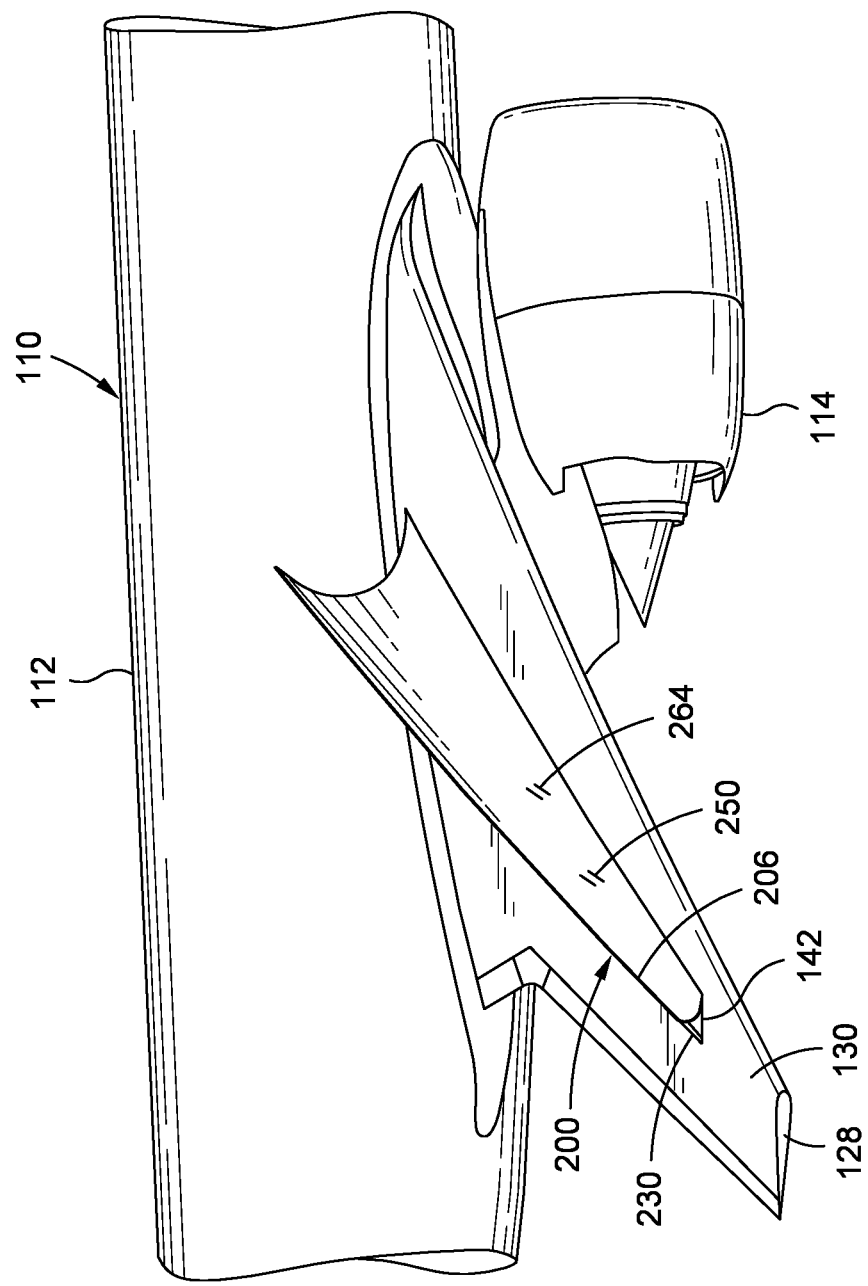
FIG. 6 is a perspective partial view of the aircraft of FIG. 5 showing the aerodynamic brake in the deployed position and illustrating the flexible sheet in the open state.
Figure 8:
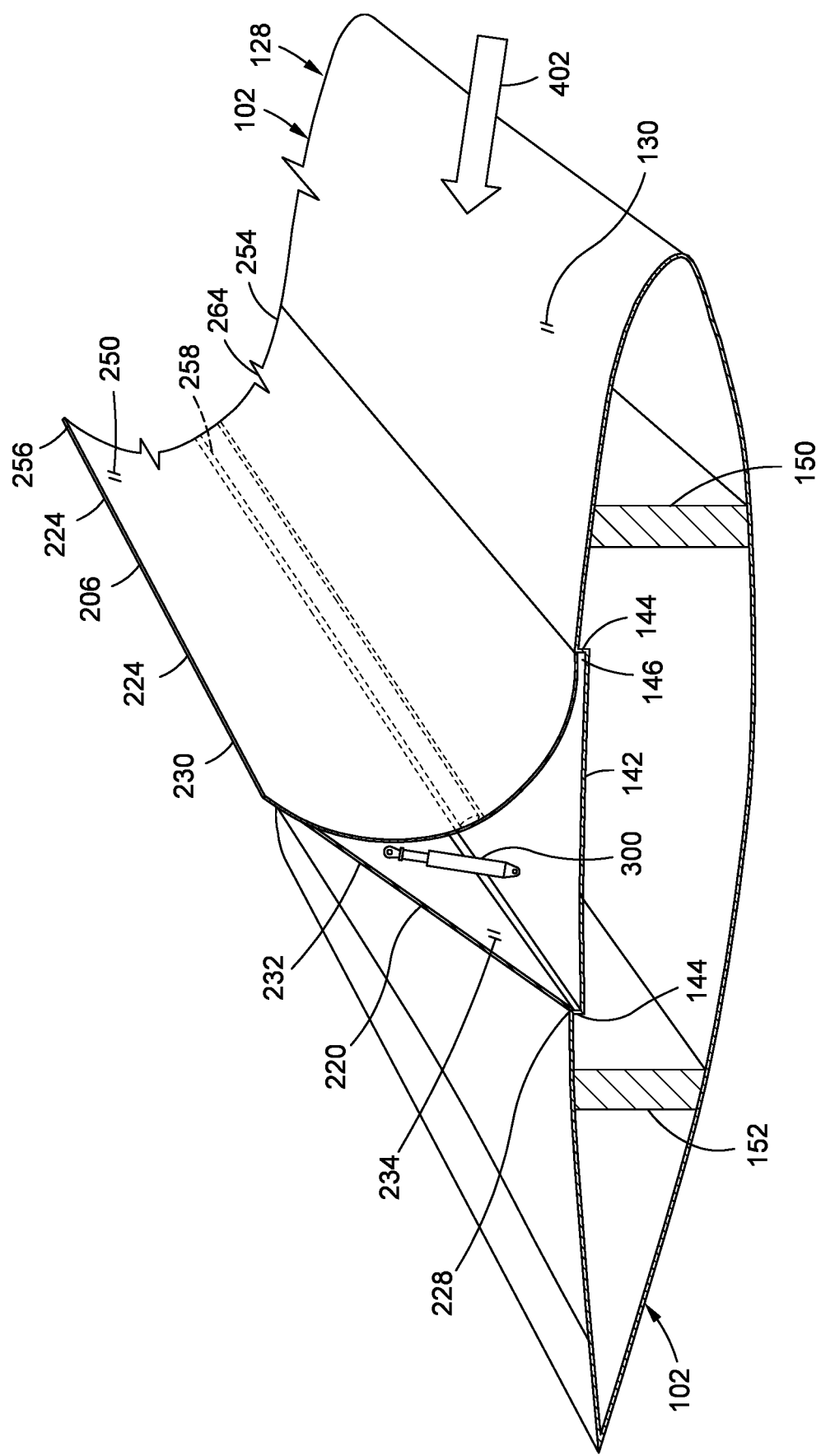
FIG. 8 is a perspective view of a portion of a wing showing an example of an aerodynamic brake in which the flexible sheet includes a batten extending along a spanwise direction for increasing spanwise stiffness of the flexible sheet.

FIG. 4 is a front view of the aircraft configuration of FIG. 2. In FIG. 4, the aerodynamic brake 200 on each wing 128 is in the deployed position 206. FIG. 6 is a perspective view of the aircraft 110 of FIG. 5 showing the aerodynamic brake 200 in the deployed position 206 and illustrating the flexible sheet 250 in the open state 264 and exposed to the oncoming airflow 402 (FIG. 8). The aircraft 110 in FIGS. 2, 4 and 6 may be in a landing configuration in which the high-lift devices 134 (e.g., leading edge slats 135 and trailing edge flaps 136—FIG. 2) have been extended and the aerodynamic brakes 200 have been moved to the deployed position 206 after the wheels of the main landing gear 116 (FIG. 4) have touched down on the runway 400 surface. In some examples, the aerodynamic brakes 200 may be moved to the deployed position 206 after an indication has been received that the main landing gear 116 is supporting at least a portion of the aircraft weight.

In an example described in greater detail below, the deployment of the aerodynamic brake 200 may be manually commanded such as by a member of the flight crew actuating a mechanical switch (e.g., a button or lever) or an electronic switch (e.g., on a touch screen) in the cockpit of the aircraft 110. For example, a pilot or copilot may command deployment of the aerodynamic brakes 200 upon receiving an indication from a weight-on-wheels sensor (not shown) that the main landing gear 116 is supporting at least a portion of the aircraft weight during a landing. Alternatively, an aircraft 110 may be configured for autonomous (e.g., without human interaction) deployment of the aerodynamic brakes 200 such as upon an aircraft braking system (not shown) receiving an indication from one or more weight-on-wheels sensors that the main landing gear 116 is supporting at least a portion of the aircraft weight during a landing. The aerodynamic brakes 200 may also be actuated during procedures other than during a landing. For example, the flight crew may manually command deployment of the aerodynamic brakes 200 during a rejected takeoff to reduce the stopping distance of the aircraft 110. In other examples, the aerodynamic brakes 200 may be autonomously (without human intervention) deployed upon the initiation of a rejected takeoff.

As shown in FIG. 4, the aerodynamic brakes 200 in the deployed position 206 increase the aircraft frontal area relative to the frontal area of an aircraft lacking aerodynamic brakes 200. As mentioned above, the oncoming airflow 402 impinges on the flexible sheets 250 in the open state 264 and results in the generation of additional aerodynamic drag for decelerating the aircraft 110 such as during a landing roll. In addition, the aerodynamic force of the oncoming airflow 402 on the flexible sheets 250 is transferred as a downward load through the wing structure and into the main landing gear 116 which increases the frictional force between the tires and the runway 400, facilitating better traction of the tires with the runway surface and thereby reducing the landing distance. Furthermore, the aerodynamic brakes 200 disrupt airflow over the wing upper surfaces 130 which reduces the lift capability of the wings 128 during a landing and thereby further increases the amount of aircraft weight that is supported by the main landing gear 116, which further increases the frictional force between the wheels and runway surface, thereby further reducing the landing distance.

As mentioned above, the presently-disclosed aerodynamic brake 200 may obviate the need for thrust reversers on aircraft engines 114. In addition to reducing the cost, complexity and weight of the engines 114, elimination of thrust reversers may eliminate the disruption of air flow through the engines 114 caused by the thrust reversers components. Furthermore, the elimination of thrust reversers obviates the need to throttle up the engines 114 (e.g., temporarily increase the engine speed) for thrust reversal during landing, thereby reducing airport noise and cabin noise. On very high bypass ratio engines, obviating the need for thrust reversers may also eliminate the need for a variable pitch fan capable of withstanding non-symmetric backpressure during thrust reversal. Aerodynamic brakes 200 may obviate the need for thrust reversers on engines 114 of any bypass ratio including low bypass ratio engines (e.g., ratios less than 5), high bypass ratio engines (e.g., ratios of 5 or greater) and very high bypass ratio engines (e.g., ratio greater than 12). However, the aerodynamic brake 200 may optionally be implemented on an aircraft 110 that has thrust reversers.

In addition to implementation on aircraft 110 having turbofan engines 114 as shown in FIGS. 1-6, the aerodynamic brake 200 may be implemented on propeller-driven aircraft including aircraft having turboprop engines (not shown). The aerodynamic brake 200 may also be implemented on aircraft that have speed brakes or spoilers 140 as may be used during flight and/or during approach and/or during a landing. The aerodynamic brake 200 may be used to reduce wing lift and/or slow an aircraft 110 during a landing (e.g., after touchdown) during a rejected takeoff in place of the use of speed brakes or spoilers 140, or the aerodynamic brake 200 may be used in conjunction with speed brakes or spoilers 140 for reducing wing 128 lift and/or slowing an aircraft 110 during a landing or a rejected takeoff.

Although shown implemented on a commercial aircraft such as the tube-and-wing aircraft 110 in FIGS. 1-6, one or more of the presently-disclosed aerodynamic brake 200 configurations may be implemented on any type of aircraft including any type of commercial, civilian, and/or military aircraft including any type of fixed-wing aircraft and rotary-wing aircraft. Furthermore, the aerodynamic brake 200 is not limited to installation on the wings 128 of an aircraft, and may be installed at any one of a variety of locations on an aircraft including, but not limited to, the fuselage 112. For example, one or more aerodynamic brakes 200 may be implemented on the wings 128 and/or on the centerbody of a blended-wing-body aircraft (not shown) or on a flying wing aircraft (not shown). Even further, the aerodynamic brake 200 may be implemented on any type of land-based vehicle including, but not limited to, an automobile, a truck, a bus, a train, etc. For example, the aerodynamic brake 200 may be implemented on high-performance automobiles such as on race cars to improve the braking characteristics of the car.

FIG. 7 is a top view of a wing 128 of an aircraft 110 showing an example of an aerodynamic brake 200 on the wing upper surface 130. The aerodynamic brake 200 is shown having three panel actuators 300 for actuating the rigid panel 220 between the stowed position 204 and the deployed position 206. The panel actuators 300 may be spaced apart from each other along the spanwise direction of the rigid panel 220. However, any one of the aerodynamic brake 200 configurations disclosed herein may include any number of panel actuators 300 including a single panel actuator 300. In some examples, an aerodynamic brake 200 having multiple panel actuators 300 may be configured such that any one of the panel actuators 300 is capable of moving the rigid panel 220 between the stowed position 204 and the deployed position 206 in the event of a failure of one or more of the remaining panel actuators 300. The one or more panel actuators 300 of an aerodynamic brake 200 may be covered by the rigid panel 220 when the aerodynamic brake 200 is in the stowed position 204. As mentioned above, the flexible sheet 250 in the folded state 266 (FIG. 10) may also be covered by the rigid panel 220 when the aerodynamic brake 200 is in the stowed position 204.

FIG. 7 also shows an example of the geometry and placement of an aerodynamic brake 200 on the wing upper surface 130. In the example shown, the rigid panel 220 may be configured as a unitary structure extending along a spanwise direction of the wing 128. The rigid panel 220 has a panel leading edge portion 224 and a panel trailing edge portion 228. Although FIG. 7 shows the panel leading edge portion 224 located aft of the wing front spar 150, the panel leading edge portion 224 may be located approximately coincident with the wing front spar 150 (e.g., FIG. 17). Likewise, although FIG. 7 shows the panel trailing edge portion 228 located forward of the wing rear spar 152, the panel trailing edge portion 228 may be located approximately coincident with the wing rear spar 152 (e.g., FIG. 17). In still other examples not shown, the panel leading edge portion 224 may be located forward of the wing front spar 150, and/or the panel trailing edge portion 228 may be located aft of the wing rear spar 152. If the wing 128 includes high-lift devices 134 such as leading edge slats 135, the rigid panel 220 may be configured such that the panel trailing edge portion 228 is located aft of the leading edge slats 135 when in their retracted position. Similarly, if the wing 128 includes speed brakes or spoilers 140 as shown in FIG. 7, the rigid panel 220 may be configured such that the panel trailing edge portion 228 is located forward of the speed brakes and/or spoilers 140.

Figure 27:
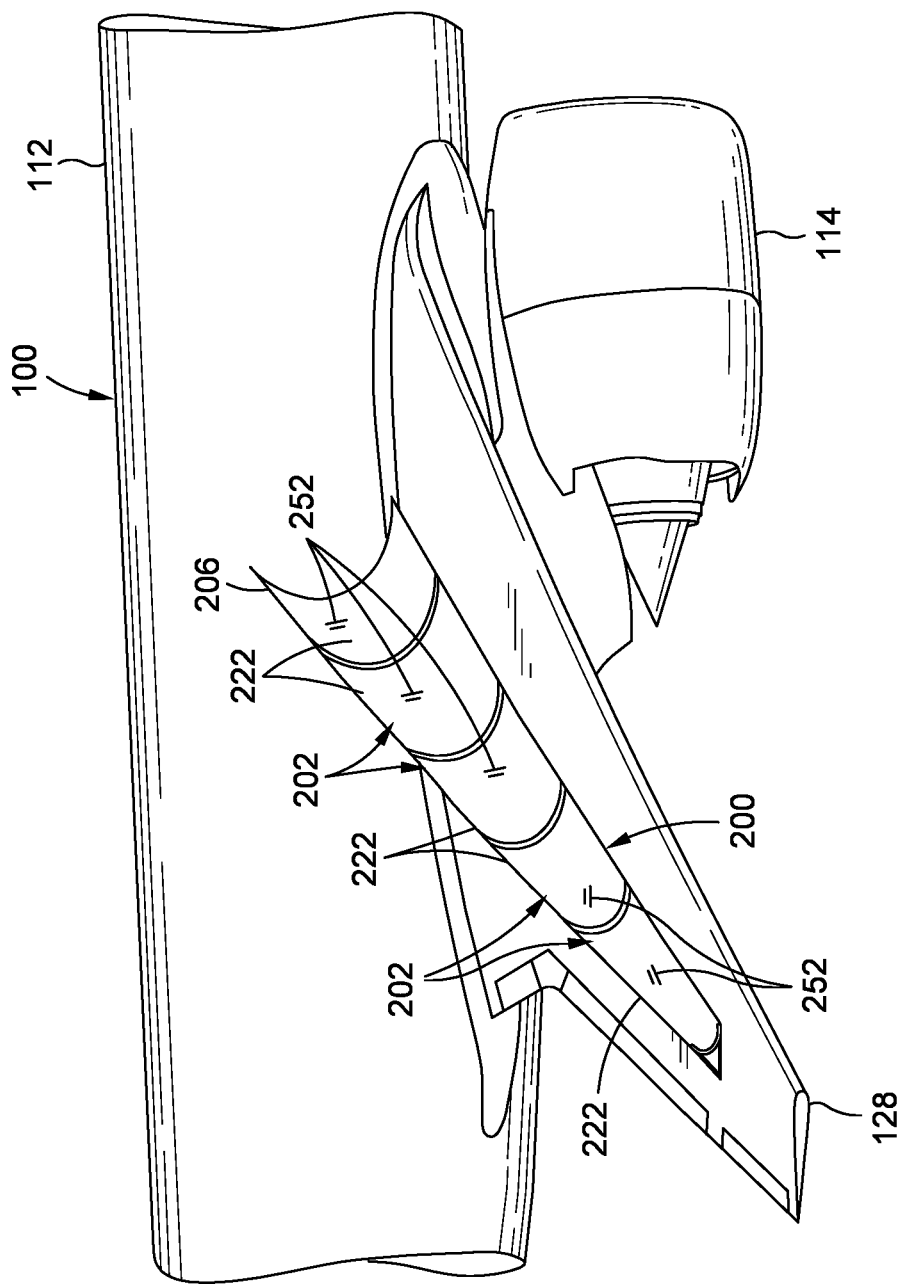
FIG. 27 is a perspective view of a portion of a wing showing an example of an aerodynamic brake comprised of a plurality of brake segments that are each actuatable independent of the remaining ones of the plurality of brake segments.

The inboard end of the rigid panel 220 may be located proximate the fuselage 112, and the outboard end of the rigid panel 220 may be located proximate the wing 128 tip. For example, in FIG. 7, the outboard end of the rigid panel 220 may be located inboard of the inboard end of the aileron 138 of the wing 128. However, the rigid panel 220 of the aerodynamic brake 200 may be configured and positioned at any location on a wing 128, and is not limited to the arrangement shown in FIG. 7. Furthermore, the aerodynamic brake 200 may be provided in an example in which the rigid panel 220 is comprised of a plurality of panel segments 222 arranged side-by-side along a spanwise direction, as shown in FIG. 27 and described in greater detail below.

Referring to FIGS. 7-8, in some examples, the vehicle body 102 may include a relatively shallow pocket or recess 142 in the body surface 104 for receiving the rigid panel 220 in the stowed position 204 (FIG. 5), as mentioned above. The recess 142 has a recess perimeter 144 that may be sized and configured complementary to the panel perimeter 230 of the rigid panel 220. For example, the recess 142 may have a length and a width that are complementary respectively to the length and width of the rigid panel 220 to minimize or avoid a gap occurring between the panel perimeter 230 and the recess perimeter 144.

In an example not shown, the aerodynamic brake 200 and/or the vehicle body 102 may include a seal configured to substantially close any gap that may occur between the panel perimeter 230 and the recess perimeter 144 when the rigid panel 220 is in the stowed position 204. For an aerodynamic brake 200 installed on a wing upper surface 130, such a seal may prevent the occurrence of an upward suction force (not shown) on the rigid panel 220 which may otherwise occur as a result of the area of low pressure that exists on top of the wing 128 as the oncoming airflow 402 passes over the wing 128. A seal extending along the panel leading edge portion 224 may be configured as an extruded rubber bulb seal. A seal extending along the panel trailing edge portion 228 may be configured as an extruded rubber blade seal. However, the seal may be provided in any one of a variety of configurations and materials.

Referring to FIG. 8, shown is an example of an aerodynamic brake 200 in the deployed position 206. The wing upper surface 130 includes the recess 142 sized and configured to receive the rigid panel 220 when the aerodynamic brake 200 is in the stowed position 204 (FIG. 5). The rigid panel 220 may be provided as a non-flexible member that is rigid in the out-of-plane direction (e.g., non-bendable) and rigid in the in-plane rigid (i.e., non-stretchable). The rigid panel 220 may be formed of any suitable metallic such as aluminum or titanium and/or the rigid panel 220 may be formed of non-metallic material such as polymeric material including fiber-reinforced polymer matrix material skin (e.g., graphite-epoxy composite material).

As mentioned above, the rigid panel 220 may configured to be pivotable about the panel trailing edge portion 228 during at least a portion of the movement between the stowed position 204 (FIG. 5) and the deployed position 206. For example, in the example shown in FIG. 8, the panel trailing edge portion 228 may be pivotably coupled to the vehicle body 102 (e.g., the wing 128) of the vehicle 100 (e.g., aircraft 110). The aerodynamic brake 200 may include one or more panel actuators 300 as shown in FIG. 8. The panel trailing edge portion 228 may be directly pivotably coupled to the vehicle body 102 (e.g., the wing 128). The one or more panel actuators 300 are configured to pivot the rigid panel 220 about the panel trailing edge portion 228. In other examples described below, the rigid panel 220 may be mounted on one or more mounting brackets 270 (e.g., FIG. 9). Such mounting brackets 270 may include a mounting bracket panel end 274 and a mounting bracket body end 272. The rigid panel 220 may be coupled to the mounting bracket panel end 274 of each mounting bracket 270. The mounting bracket body end 272 may be directly pivotably coupled to the vehicle body 102 for pivoting the mounting brackets 270 and rigid panel 220 as a unit during at least a portion of the movement of the rigid panel 220 between the stowed position 204 and the deployed position 206 as shown in FIGS. 9-13 and in FIGS. 19 and 22-24 and described in greater detail below.

Referring still to FIG. 8, the aerodynamic brake 200 may include one or more panel actuators 300 configured as linear actuators and each axially extending between the vehicle body 102 and the rigid panel 220. In an example, the panel actuator 300 may be a hydraulic actuator. In the example of an aircraft 110, the panel actuators 300 may be fluidly coupled to a hydraulic flight control system (not shown) of the aircraft 110. In another example not shown, the panel actuators 300 may be configured as pneumatic cylinders. In a still further example not shown, the panel actuators 300 may be configured as electro-mechanical actuators. Alternatively, the panel actuators 300 may be configured as rotary actuators. In this regard, any one of the presently-disclosed examples of the aerodynamic brake 200 may include any one or more of a variety of different types of panel actuators 300, and are not limited to linear actuators.

In FIG. 8, one end of the panel actuator 300 may be attached to the vehicle body 102 at a location within the recess 142, and an opposite end of the panel actuator 300 may be attached to the rigid panel 220. The one or more panel actuators 300 may be configured to pivot the rigid panel 220 between the stowed position 204 and the deployed position 206. In the stowed position 204 (e.g., FIG. 11), as mentioned above, the panel outer surface 232 may be substantially flush with the body surface 104 of the vehicle body 102 and may cover the flexible sheet 250 which may be collapsed in a folded state 266 (FIG. 10) between the panel inner surface 234 and the recess 142. The recess 142 may be as thin as possible to avoid occupying some of the space that may otherwise be used for carrying fuel in the wing fuel tanks (not shown). In the deployed position 206 shown in FIG. 8, the rigid panel 220 is pivoted about the panel trailing edge portion 228 causing the panel leading edge portion 224 to be pivoted away from the vehicle body 102 and pulling the flexible sheet 250 into the open state 264.

FIG. 8 shows the flexible sheet 250 in the open state 264 and exposed to an oncoming airflow 402 relative to a forward-moving direction of the vehicle 100. The flexible sheet 250 has out-of-plane flexibility or bendability at least along a chordwise direction to allow the flexible sheet 250 to transition between the folded state 266 (FIG. 11) and the open state 264 (FIG. 8). As mentioned above, impingement of the oncoming airflow 402 onto the flexible sheet 250 in the open state 264 generates aerodynamic drag for decelerating a vehicle 100 such as an aircraft 110 during landing. The flexible sheet 250 may be non-stretchable. For example, the flexible sheet 250 may be formed of a non-stretchable fabric such as a fiber-reinforced fabric. In one example, the material for the flexible sheet 250 may be a high-strength fabric such as parachute cloth or ripstop Nylon™. In other examples, the flexible sheet 250 may be formed of a flexible polymeric material which may or may not include reinforcing fibers extending along the chordwise direction and/or the spanwise direction.

The flexible sheet 250 has a sheet lower edge portion 254 and a sheet upper edge portion 256. The sheet lower edge portion 254 is coupled to the vehicle body 102. The sheet upper edge portion 256 is coupled to the panel leading edge portion 224. The sheet lower edge portion 254 may be coupled to the vehicle body 102 at a location forward of the panel trailing edge portion 228. For example, the sheet lower edge portion 254 may be coupled to the recess leading edge portion 146 of the recess 142. The sheet upper edge portion 256 may be coupled to the panel proximate the panel leading edge portion 224. For example, in the example shown in FIGS. 20-21 and described below, the sheet upper edge portion 256 may be coupled to a lip 226 of the panel leading edge portion 224.

In the present disclosure, the terms "upper" and "lower" refer only to the positions of the sheet edge portions relative to the body surface 104 when the flexible sheet 250 is in the open state 264, and do not limit the sheet upper edge portion 256 to being located vertically higher than the sheet lower edge portion 254 when the flexible sheet 250 is in the folded state 266 or open state 264. For example, for an example of an aerodynamic brake 200 mounted on a side of a fuselage 112 (not shown) in which the rigid panel 220 is pivotable about a vertical axis, the sheet upper edge portion 256 may be located laterally outboard (e.g., to the side) of the sheet lower edge portion 254 when the flexible sheet 250 is in the open state 264.

Referring still to FIG. 8, the area and shape of the flexible sheet 250 in the open state 264 may be configured according to the amount of aerodynamic drag that is desired, considering various factors such as the desired vehicle deceleration rate, the speed range of the vehicle 100 at deployment, the mass of the vehicle 100 at deployment, and other factors. The flexible sheet 250 in the open state 264 may be configured to have a cross-section (e.g., taken along a vertical plane oriented parallel to the forward-moving direction) having a curved concave shape oriented approximately normal to the direction of the oncoming airflow 402. Advantageously, the flexibility of the sheet material allows the flexible sheet 250 to assume the curved concave cross-sectional shape when the flexible sheet 250 is subjected to the oncoming airflow 402. In the example of FIG. 13, the curved concave cross-sectional shape of the flexible sheet 250 in the open state 264 may have a depth that is greater that the straight-line distance between the forwardmost point of the panel leading edge portion 224 and the forwardmost point of the recess leading edge portion 146. The depth of the curved concave cross-sectional shape is measured perpendicular to the straight-line distance between the forwardmost point of the panel leading edge portion 224 and the forwardmost point of the recess leading edge portion 146. In an alternative example shown in FIGS. 9 and 24, the curved concave cross-sectional shape of the flexible sheet 250 in the open state 264 may have a depth that is less that the straight-line distance between the forwardmost point of the panel leading edge portion 224 and the forwardmost point of the recess leading edge portion 146.

A curved concave cross-sectional shape of the flexible sheet 250 in the open state 264 may maximize the amount of aerodynamic drag generated. For example, the curved concave cross-sectional shape of the flexible sheet 250 in the open state 264 may result in a buildup of high pressure air in front of the flexible sheet 250 and/or the curved concave cross-sectional shape may partially impede the spillage of oncoming airflow 402 up and over the upper edge of the rigid panel 220 as the oncoming airflow 402 passes over the aerodynamic brake 200. High pressure air in front of the flexible sheet 250 and/or the impeded spillage of oncoming airflow 402 may increase the amount of aerodynamic drag generated by the aerodynamic brake 200 relative to the aerodynamic drag generated by an aerodynamic brake 200 having a sheet that assume a less curved or a generally flat shape (not shown) when the aerodynamic brake 200 is in the deployed position 206 and the flexible sheet 250 is in the open state 264. In a further example not shown, the flexible sheet 250 may include a plurality of apertures (not shown—e.g., circular holes, slots, slices) that may be uniformly or non-uniformly distributed throughout one or more regions of the flexible sheet 250 as a means to allow at least a portion of the impinging air to pass through the flexible sheet 250. The size and/or spacing of such apertures may have an effect (e.g., an increase or a decrease) on the magnitude of aerodynamic drag generated by the aerodynamic brake 200.

Referring still to FIG. 8, in some examples, the flexible sheet 250 may include one or more battens 258 extending along a spanwise direction for increasing the spanwise stiffness of the flexible sheet 250 in the open state 264 when subjected to the oncoming airflow 402. The increased spanwise stiffness of the flexible sheet 250 provided by the one or more battens 258 may reduce or prevent flutter of the flexible sheet 250 when subjected to the oncoming airflow 402. As shown in FIG. 8, the one or more battens 258 may be oriented generally parallel to the sheet upper edge portion 256 and/or sheet lower edge portion 254. The increased spanwise stiffness provided by the one or more battens 258 may prevent the partial folding of the inboard side edge and outboard side edge of the flexible sheet 250 which may reduce spillage of air from the side edges of the flexible sheet 250, thereby increasing the effectiveness of the flexible sheet 250 in generating aerodynamic drag.

In FIG. 8, each batten 258 may be a relatively thin elongate member that is relatively stiff and resistant to bending. In an example, the battens 258 may be formed of relatively stiff metallic or non-metallic material. For example, one or more of the battens 258 may be formed of aluminum, steel, titanium, and/or polymeric material such as plastic, fiberglass, or composite material (e.g., fiber-reinforced polymer matrix material). The flexible sheet 250 may include one or more elongate pockets (not shown) each configured to receive a batten 258. Such pockets may be sewn, integrated, or molded into the flexible sheet 250. Each batten 258 may be secured inside a pocket by a securing mechanism (not shown) such as a strap or a cord attached to the flexible sheet 250 and configured to extend around the end of each batten 258 to prevent the batten 258 from slipping out of the pocket.

Figure 9:
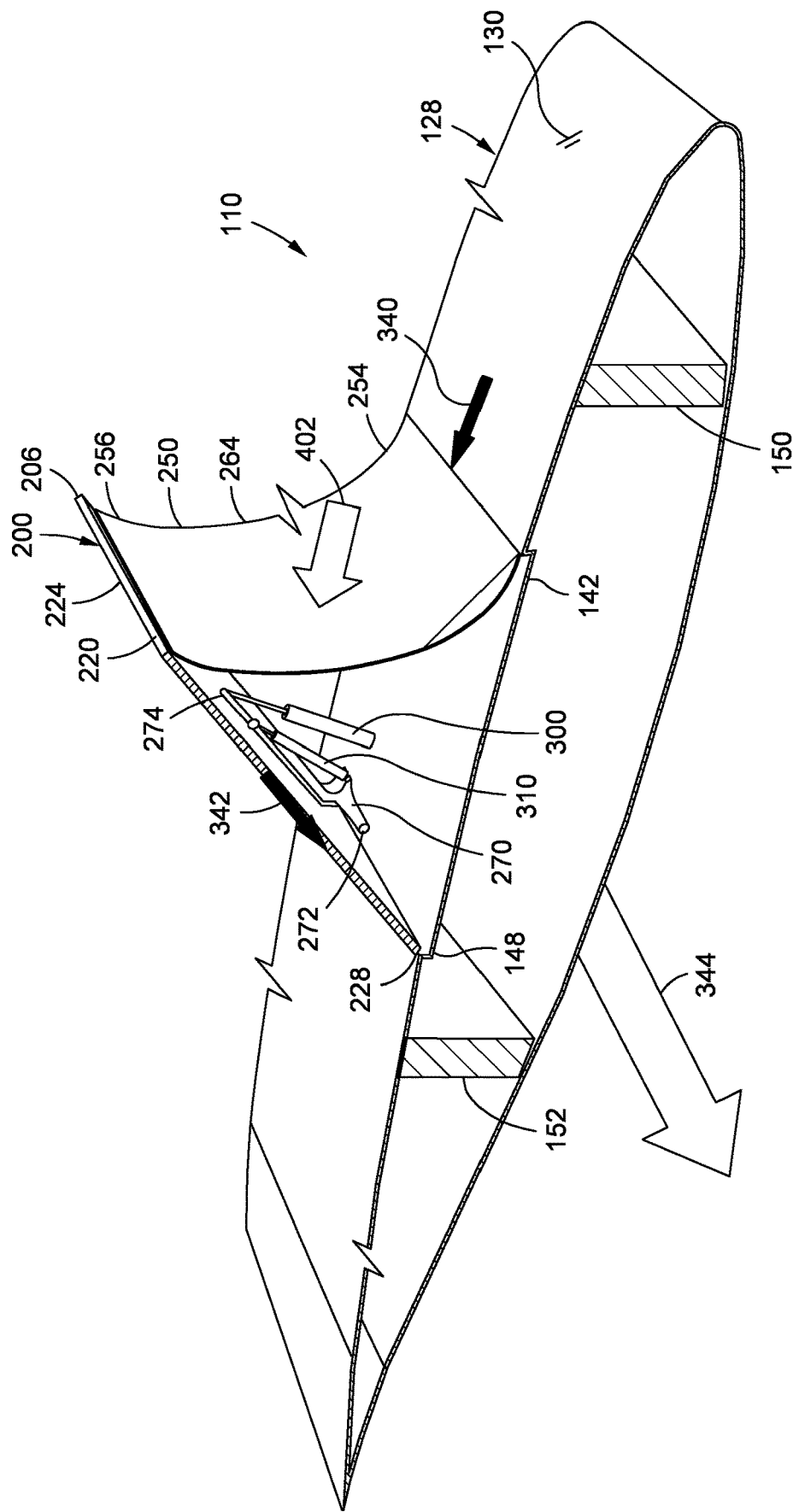
FIG. 9 is a perspective view of a portion of a wing showing an example of an aerodynamic brake in the deployed position and the flexible sheet in the open state exposed to the oncoming airflow and resulting in a tension load transmitted to the wing front spar and a compression load transmitted to the wing rear spar, and further illustrating a resultant of the tension load and compression load being transmitted to the main landing gear (FIG. 6) of aircraft.

FIG. 9 shows a portion of a wing 128 and a portion of an aerodynamic brake 200 in the deployed position 206. The flexible sheet 250 is in the open state 264 and subjected to the oncoming airflow 402 which generates aerodynamic drag for slowing the aircraft 110. Due to its flexible nature, the flexible sheet 250 efficiently directs load into the wing 128 structure. More specifically, the aerodynamic drag load generated by the aerodynamic brake 200 is reacted through the top of the wing 128. For example, as shown in FIG. 9, the sheet lower edge portion 254 directs a predominantly forward-aft tension load 340 into the wing front spar 150 (e.g., via the wing skin). The sheet upper edge portion 256 directs a predominantly aft-and-downwardly-angled compression load 342 into the rigid panel 220, and which is transferred (e.g., by the wing skin) into the wing rear spar 152. Advantageously, the load of the aerodynamic drag is distributed into the wing front spar 150 and wing rear spar 152 along the span of the flexible sheet 250 and rigid panel 220. In contrast, for an aircraft 110 having thrust reversers, the aerodynamic drag load generated by thrust reversers is generally concentrated at the engine mounts, requiring an increase in the structural mass of the engine mounts which increases the weight of the aircraft 110.

Referring still to FIG. 9, for an aircraft 110 having aerodynamic brakes 200, the resultant force 344 of the forward-aft tension load 340 and the aft-and-downwardly-angled compression load 342 is a downwardly-angled load on the main landing gear 116 (FIG. 6), the vertical component of which increases the frictional force between the tires and the runway 400 surface. The increased frictional force improves traction of the tires with the runway 400 (FIG. 2) surface which allows for a shorter landing distance than for the same aircraft lacking aerodynamic brakes 200. In addition to increasing the tire-runway friction due to the resultant force 344 on the main landing gear 116, each aerodynamic brake 200 also disrupts airflow over the wing upper surface 130 which reduces the amount of aerodynamic lift generated by the wings 128 during a landing and thereby increases the amount of aircraft weight that is supported by the main landing gear 116. The increased weight on the main landing gear 116 further increases the frictional force between the tires and runway 400 surface, which further increases the effectiveness of the wheel brakes in decelerating the aircraft 110.

Advantageously, aerodynamic brakes 200 may be implemented on an aircraft 110 with a small increase in weight relative to the large amount of weight added by thrust reversers. In this regard, the technical effect of implementing aerodynamic brakes 200 and eliminating thrust reversers from an aircraft 110 is a reduction in overall aircraft weight, the effect of which is an increase in fuel efficiency, load carrying capability, climb rate, and/or range of the aircraft 110. In addition, the elimination of thrust reversers may eliminate the associated cost and complexity that such thrust reversers add to the aircraft engines.

In FIGS. 9-13, the aerodynamic brake 200 includes one or more panel actuators 300, and may include one or more auxiliary actuators 310. In addition, the aerodynamic brake 200 may include one or more mounting brackets 270 for supporting the rigid panel 220 For example, the rigid panel 220 may be supported by a plurality (e.g., FIG. 19) of mounting brackets 270 arranged in spaced relation to each other along a spanwise direction of the rigid panel 220. In FIG. 19, each one of the mounting brackets 270 has a mounting bracket body end 272 and a mounting bracket panel end 274. Each mounting bracket body end 272 may be pivotably coupled to the vehicle body 102 for pivoting, via one or more panel actuators 300, the mounting brackets 270 in order to move the rigid panel 220 between the stowed position 204 (FIG. 10) and the deployed position 206 (FIG. 9), as described in greater detail below. In the example of FIGS. 9-13, the mounting bracket body ends 272 of the mounting brackets 270 are coupled to the vehicle body 102 within the recess 142 at the recess trailing edge portion 148. However, the mounting bracket body ends 272 may be coupled to the vehicle body 102 at a location outside of the recess 142.

The rigid panel 220 may be pivotably coupled to the mounting bracket panel ends 274 of the one or more mounting brackets 270. For example, the rigid panel 220 may include a plurality of tabs (not shown) protruding inwardly from the panel inner surface 234. The plurality of mounting bracket panel ends 274 may be pivotably coupled to the plurality of tabs. The one or more auxiliary actuators 310 may be coupled to the mounting brackets 270. In FIGS. 9-13, each auxiliary actuator 310 may be a linear actuator (e.g., a hydraulic actuator, a pneumatic actuator, an electromechanical actuator) axially extending between the mounting brackets 270 and the rigid panel 220

The one or more auxiliary actuators 310 may be actuated to cause the rigid panel 220 to pivot about the mounting bracket panel ends 274 during certain operations. For example, in the event of a rejected landing with the rigid panel 220 in the deployed position 206, the auxiliary actuators 310 may be actuated to rapidly move the rigid panel 220 to the stowed position 204 (FIG. 10). More specifically, during a rejected landing, the auxiliary actuators 310 may be actuated to quickly pivot the panel trailing edge portion 228 upwardly away from the vehicle body 102 (e.g., the wing upper surface 130) while simultaneously pivoting the panel leading edge portion 224 downwardly toward the vehicle body 102 as shown in FIGS. 12-13 in order to quickly reduce exposure of the flexible sheet 250 to the oncoming airflow 402 while the panel actuators 300 move the rigid panel 220 back to the stowed position 204.

Referring to FIGS. 10-11, the rigid panel 220 may be supported on a plurality of mounting brackets 270. The aerodynamic brake 200 is shown having a plurality of panel actuators 300 extending between the recess 142 and the mounting brackets 270 for moving the mounting brackets 270 and rigid panel 220 between the stowed position 204 (FIG. 10) and the deployed position 206 (FIG. 11). In addition, the aerodynamic brake 200 may include the above-mentioned plurality of auxiliary actuators 310 each extending between the rigid panel 220 and an auxiliary actuator mounting boss 276 of each mounting bracket 270. As described above with regard to FIG. 9, the auxiliary actuators 310 are configured to pivot the rigid panel 220 about the mounting bracket panel ends 274.

FIG. 10 shows the aerodynamic brake 200 in the stowed position 204 in which the rigid panel 220 is in the recess 142 in the wing upper surface 130. The recess 142 may have a depth that is complementary to the thickness of the rigid panel 220. For example, the rigid panel 220 and/or the recess 142 may be configured to provide space to accommodate the flexible sheet 250 in the folded state 266 between the recess 142 and the panel inner surface 234 of the rigid panel 220 in the stowed position 204. In addition, the recess 142 may be configured to provide space to accommodate the mounting brackets 270, the panel actuators 300, and the auxiliary actuators 310. The recess 142 may optionally include one or more cavities (not shown) configured to respectively receive the one or more auxiliary actuators 310 and one or more panel actuators 300 when the rigid panel is in the stowed position 204. Furthermore, the rigid panel 220 may be sized and configured such that when in the stowed position 204, the rigid panel 220 nests within the recess 142 such that the panel outer surface 232 forms a smooth continuation of the outer mold line or aerodynamic contour of the wing upper surface 130 without any steps or discontinuities in the aerodynamic contour of the wing upper surface 130. In an example, the panel outer surface 232 may be substantially flush (e.g., within 0.050 inch) with the body surface 104 (e.g., wing upper surface 130) of the vehicle body 102 (e.g., wing 128) when the rigid panel 220 is in the stowed position 204.

FIG. 11 shows the aerodynamic brake 200 transitioning from the stowed position 204 (FIG. 10) to the deployed position 206. Movement of the rigid panel 220 from the stowed position 204 to the deployed position 206 may be facilitated by actuation of the panel actuators 300. As the rigid panel 220 pivots about the mounting bracket body ends 272, the panel leading edge portion 224 pivots upwardly away from the wing upper surface 130 and the flexible sheet 250 transitions from the folded state 266 (FIG. 10) to the open state 264 (FIG. 11). In the open state 264, the flexible sheet 250 is exposed to the oncoming airflow 402 relative to the forward-moving direction of the vehicle 100. Impingement of the oncoming airflow 402 on the flexible sheet 250 generates aerodynamic drag for decelerating the vehicle 100 such as during a landing of an aircraft 110 and/or during a rejected takeoff. In the deployed position 206, the rigid panel 220 may be oriented at an angle relative to the vehicle body 102 (e.g., wing upper surface 130) causing the flexible sheet 250 to assume a curved concave cross-sectional shape which may maximize the amount of aerodynamic drag generated by the aerodynamic brake, as described above. In the deployed position 206, the rigid panel 220 may be oriented at an angle of up to 90 degrees relative to the body surface 104 (e.g., wing upper surface 130). More preferably, the rigid panel 220 in the deployed position 206 may be oriented at an angle of between approximately 20-70 degrees. The angle of deployment of the rigid panel 220 when in the deployed position 206 may be dependent upon a variety of factors including, but not limited to, the desired amount of aerodynamic drag and/or the load-carrying capability of the rigid panel 220, the flexible sheet 250, and/or the structure (e.g., of the wing 128) supporting the aerodynamic brake 200.

FIGS. 12-13 shows the rigid panel 220, originally in the deployed position 206 (FIG. 11), being pivoted about the mounting bracket panel end 274 by the auxiliary actuator 310. As mentioned above, during a rejected landing, the auxiliary actuators 310 may rapidly pivot the rigid panel 220 such that the panel trailing edge portion 228 moves upwardly and the panel leading edge portion 224 moves downwardly, assisted by the oncoming airflow 402. FIG. 12 shows the rigid panel 220 after pivoting about the mounting bracket panel ends 274 into an orientation approximately parallel to the wing upper surface 130. FIG. 13 shows the impingement of the oncoming airflow 402 onto the flexible sheet 250 and assisting in pivoting the panel leading edge portion 224 downwardly toward the vehicle body 102. In some examples, the panel actuators 300 may be actuated simultaneous with the actuation of the auxiliary actuators 310. The panel actuators 300 may pivot the mounting brackets 270 downwardly toward the vehicle body 102 while the auxiliary actuators 310 pivot the panel leading edge portion 224 downwardly toward the vehicle body 102, assisted by the oncoming airflow 402. In this regard, during a rejected landing, the panel actuators 300 and the auxiliary actuators 310 may be operated in a coordinated manner to quickly move the rigid panel 220 into the stowed position 204 (FIG. 10), thereby reducing or stopping the aerodynamic brake 200 from generating aerodynamic drag that may otherwise affect the ability of the aircraft 110 to accelerate down the runway 400 and perform a takeoff.

FIGS. 14-16 illustrate an example of a panel leading edge securing mechanism 320 that may optionally be included with any one of the aerodynamic brake 200 configurations disclosed herein. The panel leading edge securing mechanism 320 may releasably secure the panel leading edge portion 224 of the rigid panel 220 to the vehicle body 102 (e.g., at the recess leading edge portion 146) when the rigid panel 220 is in the stowed position 204. The panel leading edge securing mechanism 320 may be configured to release the panel leading edge portion 224 to allow the panel leading edge portion 224 to move (e.g., pivot) away from the vehicle body 102 when the panel actuators 300 are commanded to move the aerodynamic brake 200 from the stowed position 204 to the deployed position 206. Advantageously, such panel leading edge securing mechanism 320 may prevent inadvertent or unintentional deployment of the rigid panel 220 from the stowed position 204 to the deployed position 206.

In FIGS. 14-16, the panel leading edge securing mechanism 320 as shown configured as a panel leading edge latch 326 for releasably securing the panel leading edge portion 224 to the vehicle body 102 when the rigid panel 220 is in the stowed position 204. The panel leading edge latch 326 may include an axially movable pin 330 actuated by a solenoid 328. As shown in FIG. 14, the axially movable pin 330 may be received within a bore 332. One or more of the panel leading edge latches 326 may be mounted to the vehicle body 102 such as along a spanwise direction of the recess leading edge portion 146. A corresponding quantity of bores 332 may be formed in the panel leading edge portion 224 of the rigid panel 220 In an alternative example not shown, a quantity of solenoids 328 and pins 330 may be mounted to or integrated into the panel leading edge portion 224, and a corresponding quantity of bores 332 may be formed in the recess leading edge portion 146.

As shown in FIG. 14, engagement of the pins 330 within the bore 332 may prevent upward movement of the rigid panel 220. The pins 330 of the panel leading edge latches 326 may remain engaged within the bores 332 to lock the rigid panel 220 in the stowed position 204 until the panel leading edge latches 326 are autonomously or manually commanded to disengage. In some examples, the panel leading edge latches 326 may be configured to autonomously disengage when the panel actuators 300 and optional auxiliary actuators 310 are commanded to move the rigid panel 220 from the stowed position 204 to the deployed position 206. FIG. 15 shows the pin 330 retracted thereby allowing the rigid panel 220 to pivot upwardly toward the deployed position 206. FIG. 16 shows the re-engagement of the panel leading edge portion 224 toward the recess leading edge portion 146 as the rigid panel 220 moves toward the stowed position 204 during the above-described example shown in FIG. 13 wherein the auxiliary actuators 310 rapidly pivot the rigid panel 220 about the mounting bracket panel ends 274 during a rejected landing. Although the panel leading edge securing mechanism 320 is shown in FIGS. 14-16 as a panel leading edge latch 326 having a solenoid-actuated pin 330 receivable within a bore 332, the panel leading edge securing mechanism 320 may be provided in any one of a wide variety of configurations including, but not limited to, the below-described U-shaped channel 322 illustrated in FIGS. 20-21.

Referring to FIGS. 17-25, shown is a further example of an aerodynamic brake 200, a portion of which is shown mounted to a portion of a wing 128. FIG. 17 shows the aerodynamic brake 200 incorporated into the wing 128 between the wing front spar 150 and a wing rear spar 152. FIG. 18 shows the rigid panel 220 nested within the recess 142 formed in the wing upper surface 130. The recess 142 and the rigid panel 220 are sized such that the panel leading edge portion 224 is approximately at the same chordwise location as the wing front spar 150, and the panel trailing edge portion 228 is approximately at the same chordwise as the wing rear spar 152. The close proximity of the panel leading edge portion 224 and the panel trailing edge portion 228 respectively to the wing front spar 150 and the wing rear spar 152 may facilitate the transfer of the load from aerodynamic drag directly into the wing front spar 150 and wing rear spar 152.

Figure 24:
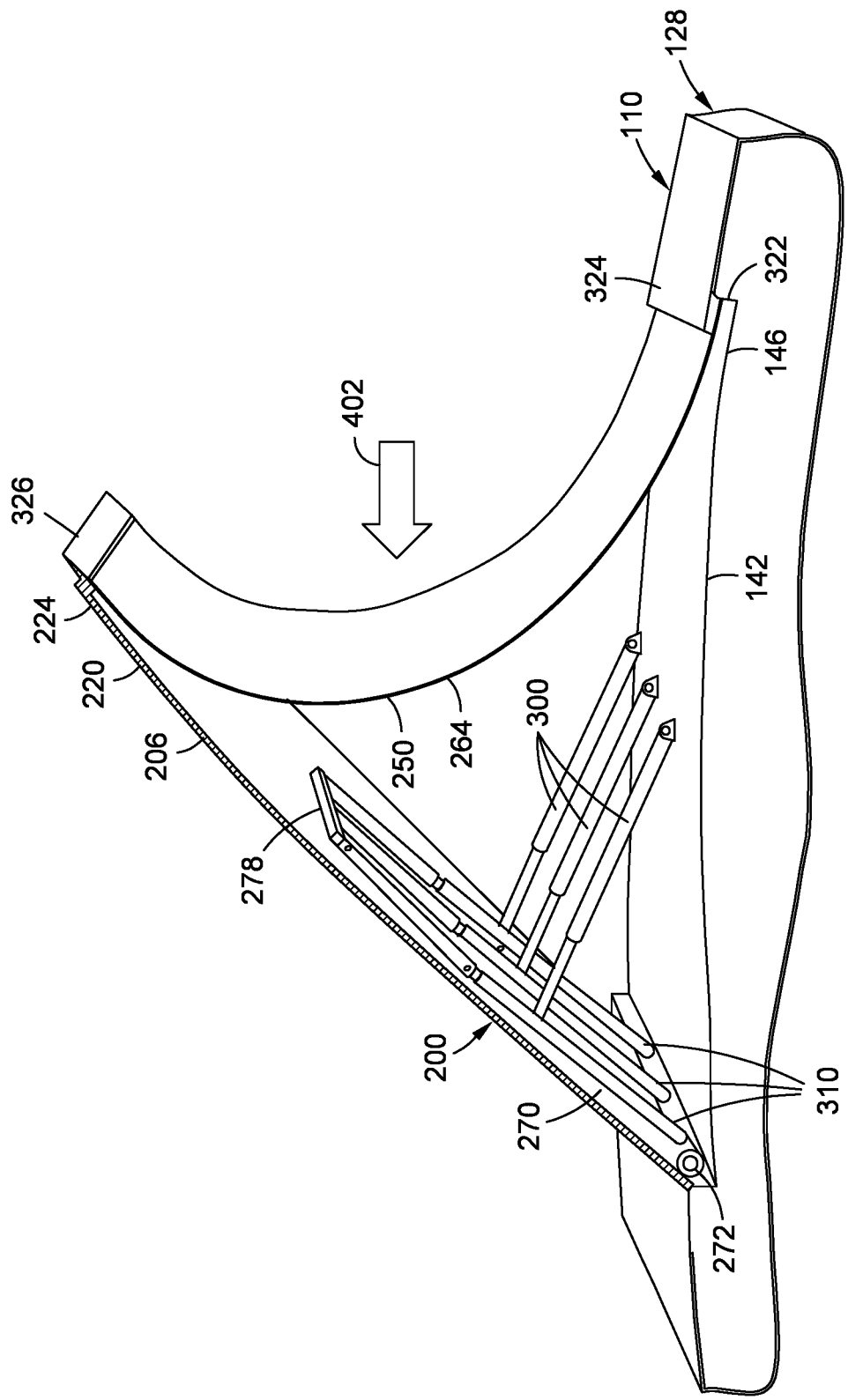
FIG. 24 is a perspective view of the portion of the wing of FIG. 17 showing the rigid panel in the deployed position and the flexible sheet in the open state and exposed to the oncoming airflow.

FIG. 19 is a forward-looking perspective view of the aerodynamic brake 200 showing the rigid panel 220 during an initial stage of movement of the rigid panel 220 from the stowed position 204 (FIGS. 17-18) to the deployed position 206 (FIG. 24). The flexible sheet 250 has been omitted for clarity. The rigid panel 220 may be supported on a mounting frame 278. The mounting frame 278 may be mounted to or integrated into the panel inner surface 234. The mounting frame 278 may be pivotably coupled to a plurality of mounting brackets 270 which may be arranged in spaced relation to each other along a spanwise direction of the rigid panel 220. The mounting frame 278 may stiffen the rigid panel 220 against out-of-plane bending and/or may distribute loads from the mounting brackets 270 into the rigid panel 220

In FIG. 19, the aerodynamic brake 200 includes a plurality of panel actuators 300 and a plurality of auxiliary actuators 310. The panel actuators 300 may each extend between the recess 142 and the corresponding plurality of mounting brackets 270. The auxiliary actuators 310 may each extend between the rigid panel 220 and the lower end of a corresponding mounting bracket 270. The panel actuators 300 and auxiliary actuators 310 may be operated in a coordinated manner to facilitate movement of the rigid panel 220 between the stowed position 204 (FIGS. 17-18) and the deployed position 206 (FIG. 24), as described in greater detail below.

FIG. 20 is a magnified view of a portion of the panel leading edge portion 224 and recess leading edge portion 146 when the rigid panel 220 is in the stowed position 204. Also shown is the flexible sheet 250 in the folded state 266 and captured within the recess 142 underneath the rigid panel 220. The sheet upper edge portion 256 may be coupled to the panel leading edge portion 224, and the sheet lower edge portion 254 may be coupled to the recess leading edge portion 146. Also shown is an example of a panel leading edge securing mechanism 320 configured as a U-shaped channel 322 for securing the rigid panel 220 in the stowed position 204. The U-shaped channel 322 is defined by an aft-facing overhang 324 that may be included with the recess leading edge portion 146. The panel leading edge portion 224 may include a forward-facing lip 226 configured to nest underneath the overhang 324 when the aerodynamic brake 200 is in the stowed position 204. The nesting of the lip 226 under the overhang 324 may prevent upward movement of the panel leading edge portion 224 when the rigid panel 220 is in the stowed position 204.

Referring to FIGS. 19-21, during the initial stage of movement of the rigid panel 220 from the stowed position 204 (FIG. 20) to the deployed position 206 (FIG. 25), the auxiliary actuators 310 may be actuated (e.g., axially extended) to cause the panel trailing edge portion 228 to pivot upwardly (FIG. 19) away from the wing 128 and the panel leading edge portion 224 to pivot downwardly toward the wing 128. Simultaneous with the actuation of the auxiliary actuators 310, the panel actuators 300 may be actuated (e.g., axially extended) to pivot the mounting brackets 270 upwardly. FIG. 21 shows the results of the coordinated actuation of the panel actuators 300 and auxiliary actuators 310 causing aftward translation of the rigid panel 220 which may facilitate disengagement of the lip 226 from the overhang 324 to thereby allow the rigid panel 220 to then be pivoted upwardly toward the deployed position 206 (FIG. 24).

Figure 22:
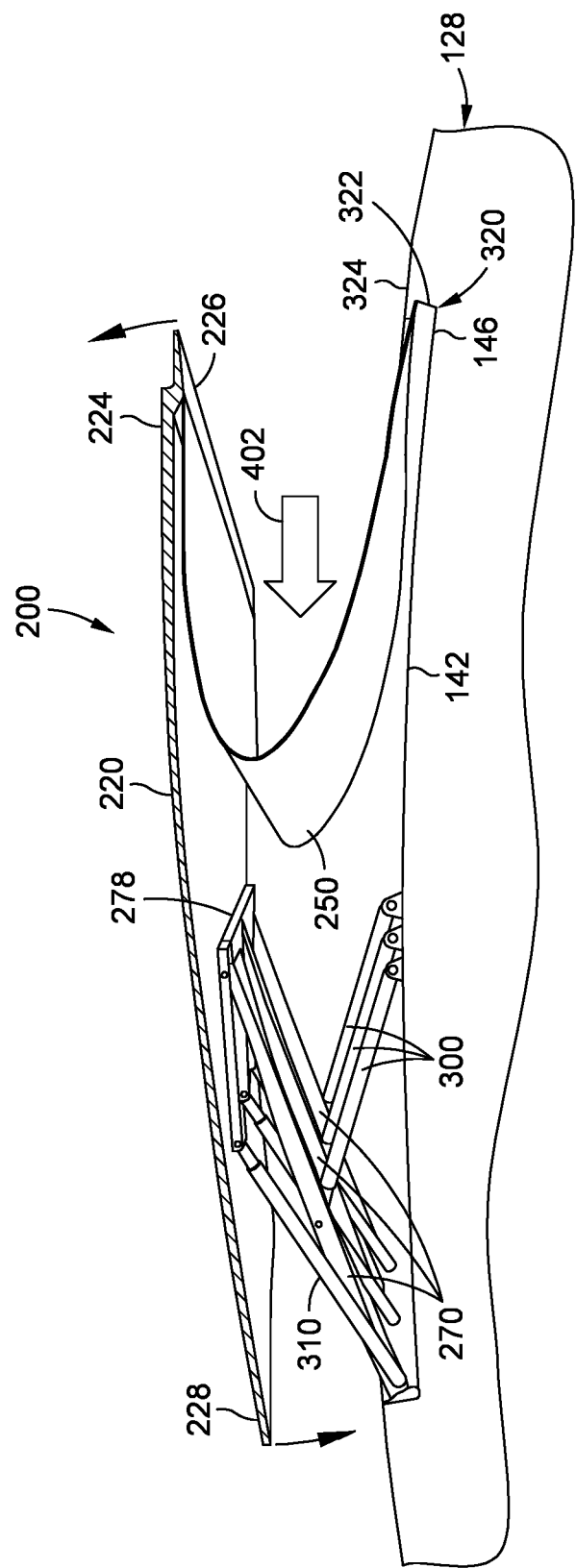
FIG. 22 is a perspective view of the portion of the wing of FIG. 17 and illustrating the auxiliary actuators pivoting the panel trailing edge portion downwardly while the panel actuators pivot the mounting brackets upwardly during movement of the rigid panel toward the deployed position.
Figure 23:
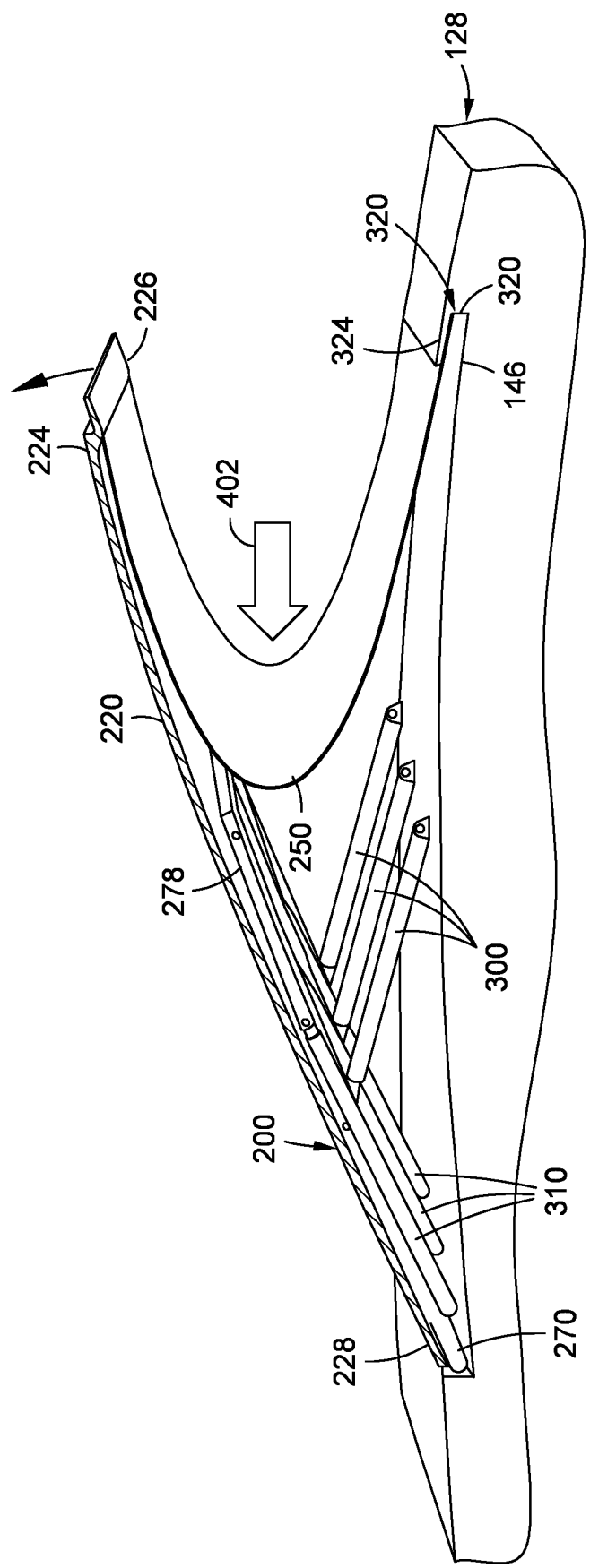
FIG. 23 is a perspective view of the portion of the wing of FIG. 17 showing the panel trailing edge portion pivoted further downwardly toward the wing upper surface and illustrating the flexible sheet moving toward the open state as the rigid panel moves toward the deployed position.

Referring to FIG. 22, upon disengagement of the lip 226 from the overhang 324, the auxiliary actuators 310 may be actuated (e.g., axially retracted) to pivot the panel trailing edge portion 228 downwardly toward the mounting brackets 270 while the panel actuators 300 are actuated (e.g., axially extended) to pivot the mounting brackets 270 upwardly. The actuation (e.g., axial retraction) of the auxiliary actuators 310 causes downward pivoting of the panel trailing edge portion 228 until coming into contact with the mounting brackets 270. FIG. 23 shows the panel trailing edge portion 228 engaged to the mounting brackets 270. The panel actuators 300 may continue to axially extend in order to continue the upward pivoting of the mounting brackets 270 to continue moving the rigid panel 220 toward the deployed position 206 (FIG. 24). The oncoming airflow 402 impinging on the flexible sheet 250 may facilitate upward pivoting of the rigid panel 220 toward the deployed position 206. FIG. 24 shows the rigid panel 220 in the deployed position 206 and the flexible sheet 250 in the open state 264 and exposed to the oncoming airflow 402 for generating aerodynamic drag for slowing the aircraft 110.

For moving the rigid panel 220 from the deployed position 206 (FIG. 24) to the stowed position 204 (FIG. 17), the panel actuators 300 and the auxiliary actuators 310 may be actuated generally in reverse sequence to the above-described actuation sequence for moving the rigid panel 220 from the stowed position 204 to the deployed position 206. For example, with the rigid panel 220 in the deployed position 206 (e.g., FIG. 24), the panel actuators 300 may be axially retracted to pivot the mounting brackets 270 downwardly about the mounting bracket body ends 272. The auxiliary actuators 310 may be axially extended to pivot the rigid panel 220 trailing edge upwardly about the mounting bracket panel ends 274. When the lip 226 of the panel leading edge portion 224 approaches the U-shaped channel 322 defined by the overhang 324 at the recess leading edge portion 146, the panel actuators 300 and the auxiliary actuators 310 may be actuated in a coordinated manner to cause forward translation of the panel leading edge portion 224 to facilitate re-engagement of the lip 226 underneath the overhang 324 (e.g., FIG. 20) for securing the rigid panel 220 in the stowed position 204 (FIGS. 17-18).

Figure 25:
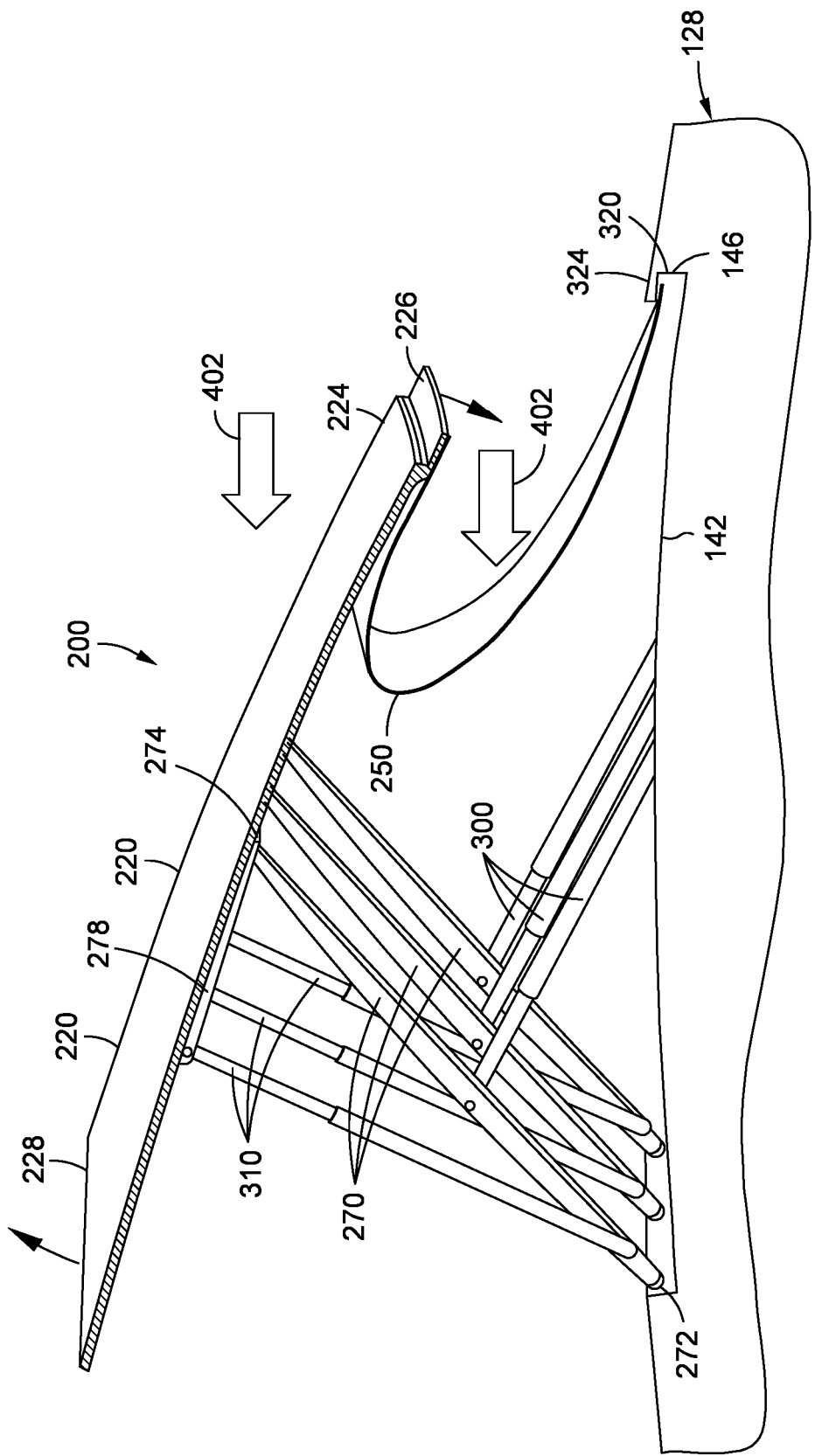
FIG. 25 is a perspective view of the portion of the wing of FIG. 17 showing coordinated actuation of the panel actuators and auxiliary actuators to pivot the panel leading edge portion downwardly toward the wing upper surface into the stowed position to reduce exposure of the flexible sheet to the oncoming airflow as may be required during a rejected landing.

Referring to FIG. 25, shown is the rigid panel 220 pivoting away from the deployed position 206 (FIG. 24) during a rejected landing. Similar to the above-described actuation of the auxiliary actuators 310 in FIGS. 12-13 during a rejected landing, the auxiliary actuators 310 in FIG. 25 may be actuated (e.g., axially extended) during a rejected landing to rapidly pivot the rigid panel 220 about the mounting bracket panel ends 274 to move the panel leading edge portion 224 downwardly and reduce exposure of the flexible sheet 250 to the oncoming airflow 402. The impingement of the oncoming airflow 402 onto the flexible sheet 250 may assist in pivoting the panel leading edge portion 224 downwardly toward the stowed position 204 (e.g., FIGS. 17-18). The lip 226 of the panel leading edge portion 224 may be re-engaged underneath the overhang 324 of the recess leading edge portion 146 by coordinated actuation of the panel actuators 300 and auxiliary actuators 310 to cause forward translation of the panel leading edge portion 224 as described above.

Figure 26:
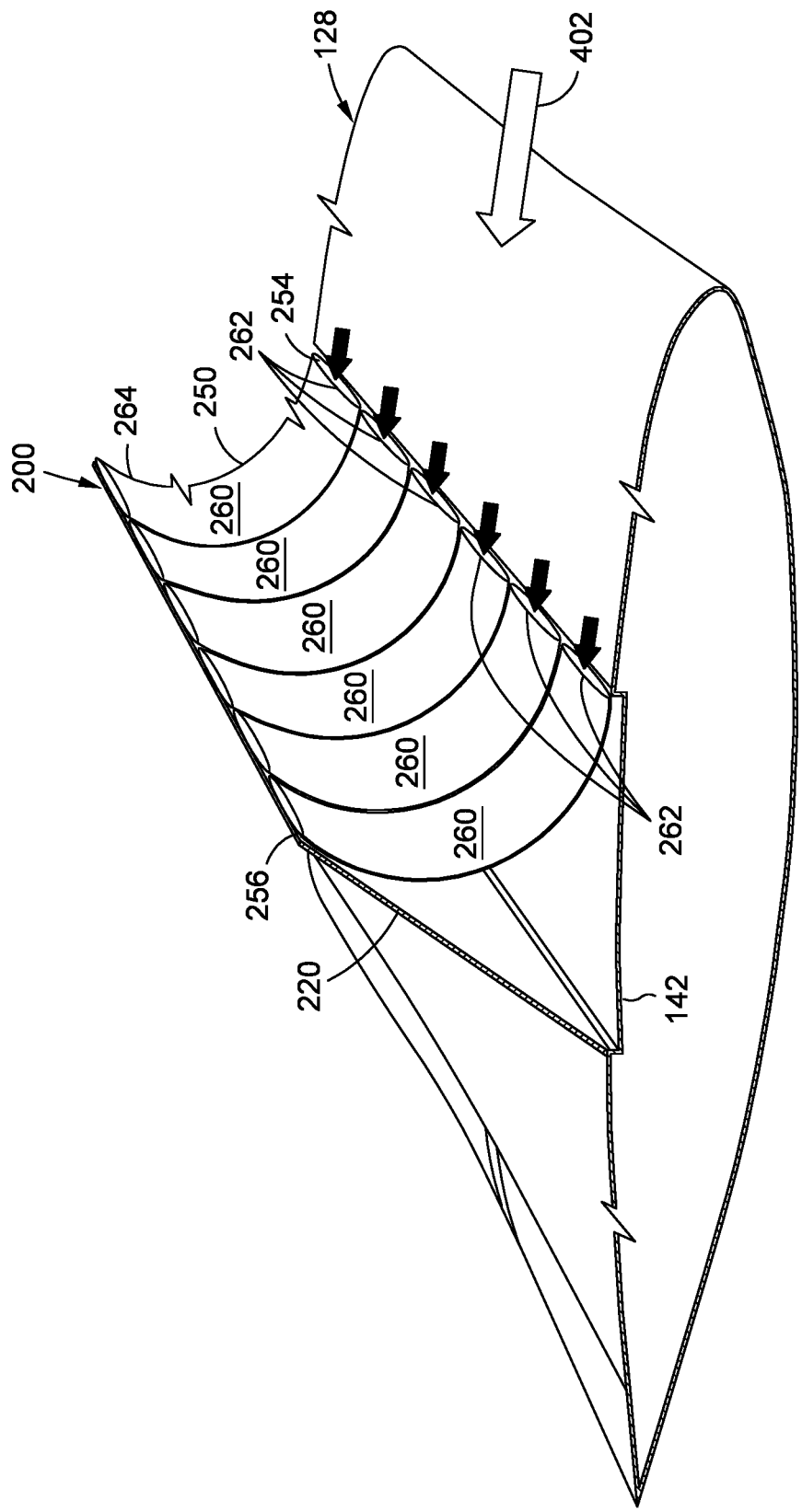
FIG. 26 is a perspective view of an aircraft having an aerodynamic brake in which the flexible sheet has a plurality of air cells configured to inflate when subjected to the oncoming airflow and resulting in increased stiffness of the flexible sheet in the open state.

FIG. 26 shows an example of an aerodynamic brake 200 in which the flexible sheet 250 has a plurality of air cells 260 configured to inflate when the flexible sheet 250 is subjected to the oncoming airflow 402. The flexible sheet 250 may have a plurality of air cell openings 262 that may face in the direction of the oncoming airflow 402 when the flexible sheet 250 is in the open state 264. In the example shown, the air cell openings 262 may be located along the sheet upper edge portion 256 and/or along the sheet lower edge portion 254. However, the air cell openings 262 may be located at alternative locations on the flexible sheet 250. The inflation of the air cells 260 may increase the bending stiffness of the flexible sheet 250 in the open state 264 and may reduce flutter of the flexible sheet 250. Additionally, the inflation of the air cells 260 may reduce spanwise bowing of the flexible sheet 250 which may reduce spillage of the air around the side edges of the flexible sheet 250, thereby increasing the amount of aerodynamic drag generated by the flexible sheet 250 in the open state 264.

FIG. 27 shows an example of an aircraft wing 128 having an aerodynamic brake 200 made up of a plurality of panel segments 222 arranged side-by-side in a spanwise direction. Each one of the panel segments 222 may be configured similar to any one of the above-described examples of the rigid panel 220. In addition, the aerodynamic brake 200 includes a plurality of sheet segments 252 respectively associated with the plurality of panel segments 222. Each one of the sheet segments 252 may be configured similar to any one of the above-described examples of the flexible sheet 250. The plurality of panel segments 222 and the plurality of sheet segments 252 collectively define a plurality of brake segments 202. Each one of the brake segments 202 has at least one panel actuator 300 (FIG. 24). The one or more panel actuators 300 of each brake segment 202 may be configured to be actuated independent of the one or more panel actuators 300 of the remaining brake segments 202 that make up the aerodynamic brake 200. In addition, any one or more of the brake segments 202 may include one or more auxiliary actuators 310 (FIG. 24) which may be configured and actuated similar to any one the above-described auxiliary actuators 310.

The plurality of brake segments 202 may be sequentially moved from the stowed position 204 (FIG. 17) to the deployed position 206 (FIG. 27). For example, during a landing, the brake segments 202 on each wing 128 of an aircraft 110 may be deployed by first deploying the inboard-most brake segment 202 on each wing 128, followed by sequential deployment of the brake segments 202 along an outboard direction the wing 128 until all of the brake segments 202 on each wing 128 are in the deployed position 206. Sequentially deploying brake segments 202 in the above-described manner may result in a more gradual generation of aerodynamic drag relative to a more abrupt generation of aerodynamic drag that may occur with the deployment of a single rigid panel 220 (FIG. 6) having a span equivalent to the collective span of side-by-side brake segments 202 (FIG. 27). The ability to independently deploy individual brake segments 202 may provide a means for controlling the magnitude of aerodynamic braking force applied to the aircraft 110 over time during a landing or during a rejected takeoff. Sequential deployment of side-by-side brake segments 202 on each wing 128 of an aircraft 110 may allow for mimicking the aerodynamic braking force-time profile associated with engine thrust reversers.

Referring still to FIG. 27, the sequence and timing with which the side-by-side brake segments 202 of an aerodynamic brake 200 are deployed may be based upon any one or more of a variety of vehicle characteristics (e.g., aircraft characteristics) and/or environmental parameters including, but not limited to, the gross weight of the aircraft upon landing, the speed of the aircraft during the landing roll, the wind speed and wind direction, and/or other factors. In addition to sequential deployment, the side-by-side brake segments 202 of an aerodynamic brake 200 may also have the capability for simultaneous deployment. Furthermore, the side-by-side brake segments 202 of an aerodynamic brake 200 may also have the capability for sequential retraction or simultaneous retraction from the deployed position 206 to the stowed position 204.

Advantageously, an aircraft 110 having side-by-side brake segments 202 on each wing 128 allows for the option of asymmetrical braking as may be desirable when the aircraft 110 is landing in a crosswind. For example, during a crosswind landing, after initial touchdown of the main landing gear 116, one or more of the brake segments 202 (e.g., the inboardmost brake segment) on the upwind wing 128 may be deployed prior to deployment of any brake segments 202 on the downwind wing 128 as a means to cancel some of the lift on the upwind wing 128 and thereby prevent potential lifting of the upwind wing 128 that may otherwise occur due to greater exposure of the upwind wing 128 to the crosswind airflow than the downwind wing 128. As the aircraft speed reduces during the landing roll, the brake segments 202 on the downwind wing 128 and any undeployed brake segments 202 on the upwind wing 128 may be deployed to further decelerate the aircraft 110. In some examples, the aerodynamic brakes 200 on an aircraft 110 may be configured such that the failure of one or more brake segments 202 to deploy on one wing 128 may cause autonomous deployment of one or more brake segments 202 on the opposite wing 128 as a means to minimize asymmetric braking which may result in undesirable yawing of the aircraft 110 during landing.

Figure 28:
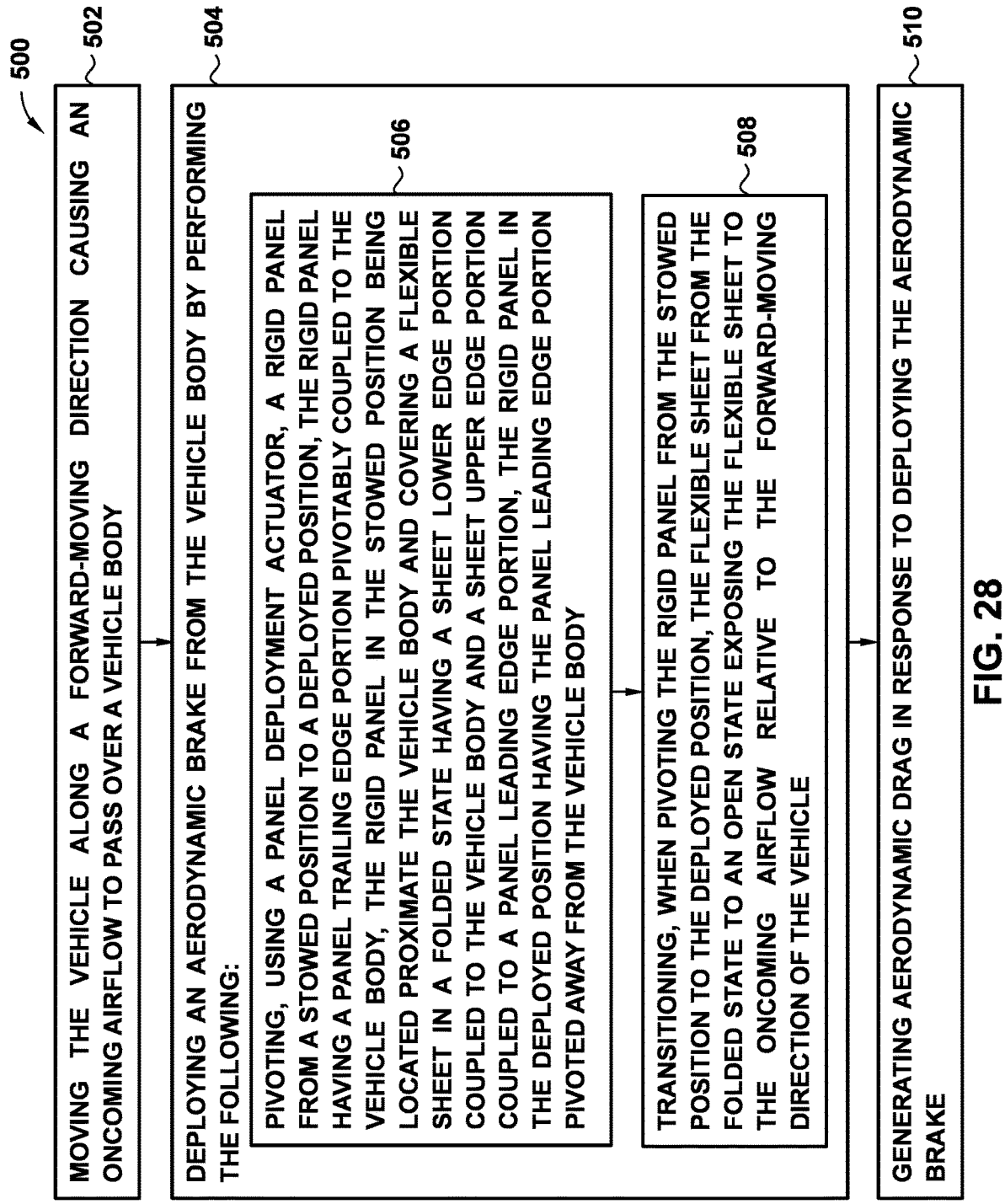
FIG. 28 is a flowchart of operations included in a method of aerodynamically braking a vehicle.

FIG. 28 is a flowchart of operations included in a method 500 of aerodynamically braking a vehicle 100. Step 502 of the method 500 includes moving the vehicle 100 along a forward-moving direction causing an oncoming airflow 402 to pass over the vehicle body 102. As described above and shown in the figures, the vehicle 100 may be an aircraft 110 having an aerodynamic brake 200 on each wing 128 for deployment during a landing and/or during a rejected take-off. Although presently shown as a tube-and-wing aircraft 110 (e.g., FIGS. 1-6), one or more aerodynamic brakes 200 may be implemented on alternative aircraft configurations such as on a blended-wing-body aircraft or on a flying wing aircraft. Furthermore, one or more aerodynamic brakes 200 may be implemented on land-based vehicles such as an automobile, as mentioned above.

As described above, an aerodynamic brake 200 includes at least rigid panel 220 and at least one flexible sheet 250. The rigid panel 220 is directly coupled (e.g., FIG. 8) or indirectly coupled (e.g., FIG. 9) to the vehicle body 102 and has a panel leading edge portion 224 and a panel trailing edge portion 228. The rigid panel 220 is pivotable about the panel trailing edge portion 228. The flexible sheet 250 has a sheet lower edge portion 254 and a sheet upper edge portion 256. The sheet lower edge portion 254 is coupled to the vehicle body 102 and the sheet upper edge portion 256 is coupled to the panel leading edge portion 224. In addition, the aerodynamic brake 200 has at least one panel actuator 300 configured to pivot the rigid panel 220 for moving the aerodynamic brake 200 from the stowed position 204 (e.g., FIGS. 17-18) and the deployed position 206 (e.g., FIG. 24), and from the deployed position 206 to the stowed position 204. An aerodynamic brake 200 may optionally include one or more auxiliary actuators 310 that may be actuated in coordination with the one or more panel actuators 300 for moving the aerodynamic brake 200 between the stowed position 204 and the deployed position 206.

In some examples, the method 500 may include receiving the rigid panel 220 within a recess 142 in the vehicle body 102. For example, in FIGS. 8-13, 17-19, and 22-26, the wing upper surface 130 includes a relatively shallow recess 142 sized and configured to receive the rigid panel 220 in the stowed position 204. The recess perimeter 144 of the recess 142 is preferably sized and configured complementary to the panel perimeter 230 of the rigid panel 220. The flexible sheet 250 in the folded state 266 may be captured between the recess 142 and the panel inner surface 234. When the rigid panel 220 is in the stowed position in the recess 142, the panel outer surface 232 may be substantially flush with the body surface 104 (e.g., the wing upper surface 130) such that the panel outer surface 232 forms a continuation of the outer mold line of the body surface 104.

In some examples, the method may include sealing a gap (not shown) that may occur between the panel perimeter 230 and the recess perimeter 144 when the rigid panel 220 is in the stowed position 204. In this regard, the aerodynamic brake 200 may include a seal (not shown) that may be attached to the rigid panel 220 and/or the vehicle body 102 for sealing such a gap between the seal perimeter and the recess perimeter 144. The seal may reduce or prevent the occurrence of a suction force pulling the rigid panel 220 away from the wing upper surface 130. Such suction force may be generated by low pressure on top of the wing 128 as a result of the oncoming airflow 402 passing over the wing upper surface 130.

In some examples, the method 500 may include releasably securing, using at least one panel leading edge securing mechanism 320, the panel leading edge portion 224 to the vehicle body 102 when the rigid panel 220 is in the stowed position 204. As described above and shown in FIGS. 14-16 and 20-21, one or more panel leading edge securing mechanisms 320 may be configured to release the panel leading edge portion 224 upon command, and allow the panel leading edge portion 224 to pivot away from the vehicle body 102. In some examples, the panel leading edge securing mechanisms 320 may be configured to release the panel leading edge portion 224 when the one or more panel actuators 300 are commanded to move the rigid panel 220 from the stowed position 204 to the deployed position 206. Advantageously, such panel leading edge securing mechanisms 320 may prevent inadvertent deployment of the rigid panel 220 when in the stowed position 204.

Referring briefly to FIGS. 14-16, the step of releasably securing the panel leading edge portion 224 to the vehicle body 102 may be performed using one or more panel leading edge latches 326. The panel leading edge latches 326 may be fixedly mounted to either the rigid panel 220 or the vehicle body 102. In an example, a panel leading edge latch 326 may be configured as an electromechanical latch mounted on the wing 128 and configured to continuously engage the panel leading edge portion 224 until the one or more panel actuators 300 are commanded to move the rigid panel 220 from the stowed position 204 to the deployed position 206. In the example shown in FIGS. 14-16, a panel leading edge latch 326 may be configured as an axially movable pin 330 that is actuated by a solenoid 328. The pin 330 may be received within a bore 332 in the panel leading edge portion 224, as described above.

Referring briefly to FIGS. 21-22, in an alternative example, the step of releasably coupling the panel leading edge portion 224 to the vehicle body 102 may include releasably securing the panel leading edge portion 224 to the vehicle body 102 using a U-shaped channel 322 configured receive the panel leading edge portion 224. In an example, the U-shaped channel 322 may be oriented in an aft-facing direction and may prevent outward (e.g., upward) movement of the panel leading edge portion 224 away from the vehicle body 102 (e.g., wing upper surface 130) while the rigid panel 220 is in the stowed position 204. As shown in FIGS. 21-22, the U-shaped channel 322 may be defined by an aft-facing overhang 324 extending from the recess leading edge portion 146. The panel leading edge portion 224 of the rigid panel 220 may include a forwardly extending lip 226 configured to nest underneath the overhang 324 when the rigid panel 220 is in the stowed position 204.

In the flow chart of FIG. 28, the method 500 further includes step 504 of deploying an aerodynamic brake 200 from a vehicle body 102. In some examples, step 502 of moving the vehicle 100 along a forward-moving direction may comprise performing a landing in an aircraft 110, and step 504 of deploying the aerodynamic brake 200 from the vehicle body 102 may comprise deploying the aerodynamic brake 200 on each wing 128 during at least a portion of the landing. The method 500 may include deploying the aerodynamic brakes 200 when the main landing gear 116 wheels contact the runway 400 surface and the main landing gear 116 bears at least a portion of the aircraft weight. The method 500 may also include retracting the aerodynamic brakes 200 when the aircraft 110 decelerates to a predetermined speed during the landing roll.

Step 504 of deploying an aerodynamic brake 200 from a vehicle body 102 (e.g., a wing 128) includes performing step 506 of pivoting a rigid panel 220 from a stowed position 204 to a deployed position 206, and performing step 508 of transitioning a flexible sheet 250 from the folded state 266 to the open state 264 when pivoting the rigid panel 220 from the stowed position 204 to the deployed position 206. As described above, transitioning the flexible sheet 250 from the folded state 266 to the open state 264 exposes the flexible sheet 250 to the oncoming airflow 402 relative to the forward-moving direction of the vehicle 100. Step 506 of pivoting the rigid panel 220 from the stowed position 204 to the deployed position 206 is performed using at least one panel actuator 300. As mentioned above, the rigid panel 220 has a panel trailing edge portion 228 which may be pivotably coupled to the vehicle body 102. For example, FIG. 8 illustrates the panel trailing edge portion 228 directly coupled to the vehicle body 102 proximate the recess trailing edge portion 148. Alternatively, FIGS. 9-13 and 22-25 illustrate the panel trailing edge portion 228 indirectly coupled to the vehicle body 102 via one or more mounting brackets 270 which are pivotably coupled to the vehicle body 102 at the mounting bracket body ends 272.

Step 506 of pivoting the rigid panel 220 from the stowed position 204 to the deployed position 206 may include pivoting the rigid panel 220 using one or more panel actuators 300, one or more of which may be configured as a linear actuator. As described above, a linear actuator may be configured as a hydraulic actuator which may be coupled to the hydraulic flight control system of the aircraft 110. In other examples, a linear actuator may be configured as a pneumatic actuator or as an electrical-mechanical actuator. As shown in FIGS. 8-13, 18-19, and 22-26, the panel actuators 300 may extend between the vehicle body 102 and the rigid panel 220. For examples in which the rigid panel 220 has a mounting frame 278 (FIG. 19) on the panel inner surface 234, the panel actuators 300 may be attached to the mounting frame 278. In an example not shown, one or more of the panel actuators 300 may be configured as a rotary actuator configured to pivot the rigid panel 220 between the stowed position 204 and deployed position 206.

For examples of the aerodynamic brake 200 in which the rigid panel 220 is supported on one or more mounting brackets 270, step 506 of pivoting the rigid panel 220 between the stowed position 204 and the deployed position 206 may comprise pivoting the mounting brackets 270 respectively about the mounting bracket body ends 272 which may be coupled to the vehicle body 102 as shown in FIGS. 10-13, 19, and 22-25. For examples where the rigid panel 220 is supported on one or more mounting brackets 270, step 506 of pivoting the rigid panel 220 between the stowed position 204 and the deployed position 206 may further include pivoting, using one or more auxiliary actuators 310, the rigid panel 220 about the mounting bracket panel ends 274 while pivoting, using one or more panel actuators 300, the mounting brackets 270 about the mounting bracket body end 272. As described above, the actuation of the panel actuators 300 and auxiliary actuators 310 may be performed in a coordinated manner for disengaging the panel leading edge portion 224 from the vehicle body 102 to allow the rigid panel 220 to be moved from the stowed position 204 to the deployed position 206. For example, as shown in FIGS. 19-21 and described above, the panel actuators 300 and auxiliary actuators 310 may be actuated in a coordinated manner to cause aftward translation of the panel leading edge portion 224 as a means to move the lip 226 of the rigid panel 220 out from underneath the overhang 324 to thereby allow the rigid panel 220 to be pivoted upwardly toward the deployed position 206 (e.g., FIG. 24). When returning the rigid panel 220 to the stowed position 204, the actuation of the panel actuators 300 and auxiliary actuators 310 may also be coordinated to cause forward translation of the panel leading edge portion 224 as a means to re-engage the lip 226 underneath the overhang 324 of the vehicle body 102 for securing the rigid panel 220 in the stowed position 204 (FIGS. 17-18)

In the flow chart of FIG. 28, step 508 of the method 500 includes transitioning the flexible sheet 250 from the folded state 266 to the open state 264 when pivoting the rigid panel 220 from the stowed position 204 to the deployed position 206. Transitioning the flexible sheet 250 into the open state 264 exposes the flexible sheet 250 to the oncoming airflow 402 relative to the forward-moving direction of the vehicle 100. In order to increase the drag-generating capability of the flexible sheet 250, the method may include stiffening the flexible sheet 250. For example, the method may include stiffening the flexible sheet 250 using one or more battens 258 extending along a spanwise direction of the flexible sheet 250. In FIG. 8, the flexible sheet 250 may include one or more battens 258 oriented parallel to the sheet upper edge portion 256 and/or sheet lower edge portion 254. The one or more battens 258 may increase the spanwise stiffness of the flexible sheet 250 in the open state 264 which may maintain the shape of the flexible sheet 250 and/or reduce or prevent flutter of the flexible sheet 250 when exposed to the oncoming airflow 402, thereby improving the drag-generating capability of the flexible sheet 250. In another example, the method may include stiffening the flexible sheet 250 in the open state 264 using a plurality of air cells 260 as shown in FIG. 27. As described above, the air cells 260 may include air cell openings 262 along the sheet lower edge portion 254 and/or along the sheet upper edge portion 256. The air cell openings 262 may be generally forward facing and/or aligned with the forward moving direction of the vehicle 100 such that when the flexible sheet 250 is in the open state 264, air may enter the air cells 260 through the air cell openings 262 and fill the air cells 260 which may increase the stiffness of the flexible sheet 250.

Step 510 of the method 500 includes generating aerodynamic drag in response to deploying the aerodynamic brake 200. The aerodynamic drag generated by the aerodynamic brake 200 may assist in decelerating a vehicle 100 such as decelerating an aircraft 110 after touchdown on a runway 400 or decelerating an aircraft 110 during a rejected takeoff. Referring briefly to FIG. 9, step 510 of generating aerodynamic drag may also increase the frictional force between the tires and the surface of the runway 400 due to a resultant force 344 acting on the main landing gear 116. The resultant force 344 acting on the main landing gear 116 (FIG. 6) results in a combination of forward-aft tension load 340 directed by the flexible sheet 250 into the wing front spar 150 and an aft-and-downwardly-angled compression load 342 directed by the rigid panel 220 into the wing rear spar 152, as described above. Deployment of the aerodynamic brakes 200 also disrupts airflow over the wings 128 which causes reduced lift-generating capability of the wings 128 causing a greater portion of the aircraft weight to be supported by the main landing gear 116 which further increases the frictional force between the tires and the runway surface. The increased frictional force improves the traction of the tires with the runway surface which reduces the stopping distance of the aircraft 110.

In some examples, during a rejected landing when the rigid panel 220 is in the deployed position 206, the method 500 may include rapidly pivoting the rigid panel 220 about the mounting bracket panel ends 274 (e.g., FIGS. 12-13 and 24-25) using one or more auxiliary actuators 310 to cause the panel trailing edge portion 228 to move upwardly away from the vehicle body 102 and the panel leading edge portion 224 to move downwardly toward the vehicle body 102 for reducing exposure of the flexible sheet 250 to the oncoming airflow 402 for reducing aerodynamic drag. In addition, the method 500 may include using one or more panel actuator 300 to pivot the rigid panel 220 about the mounting bracket body ends 272 for moving the rigid panel 220 toward the stowed position 204. Actuation of the panel actuators 300 may be at least partially contemporaneous with the actuation of the auxiliary actuators 310 to rapidly move the rigid panel 220 from the deployed position 206 to the stowed position 204 during a rejected landing.

In some examples, an aerodynamic brake 200 may be comprised of a plurality of side-by-side brake segments 202 as shown in FIG. 27. As described above, each brake segment 202 has a rigid panel 220, a flexible sheet 250, at least one panel actuator 300, and optionally at least one auxiliary actuator 310. For an aerodynamic brake 200 comprised of a plurality of side-by-side brake segments 202, step 504 of deploying the aerodynamic brake 200 may include deploying at least one of the brake segments 202 independent of the deployment of the remaining brake segments 202 of the aerodynamic brake 200. For example, the brake segments 202 on each wing 128 may be deployed in sequence, starting from the inboardmost brake segment 202 on each wing 128 and ending with the outboardmost brake segment 202 on each wing. As the aircraft 110 decelerates, more outboard brake segments 202 may be deployed. Deploying the inboardmost brake segments 202 first may minimize asymmetrical yawing of the aircraft 110 which may otherwise occur if the outboardmost brake segments 202 were deployed first. However, the brake segments 202 on each wing 128 may be deployed in any sequence.

Advantageously, the ability to independently deploy brake segments 202 allows for more precise control of the amount of aerodynamic braking provided by the aerodynamic brake. For example, independently deployable brake segments 202 may provide the capability for generating aerodynamic drag in a manner that mimics the braking force-time profile of engine thrust reversers. In addition, the ability to independently deploy individual brake segments 202 on each wing 128 allows for asymmetrical braking which may be beneficial during certain environmental conditions such as when an aircraft performs a crosswind landing.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:
1. An aerodynamic brake for a vehicle, comprising:
    at least one rigid panel having a panel leading edge portion;
    at least one flexible sheet having a sheet lower edge portion and a sheet upper edge portion, the sheet lower edge portion coupled to a vehicle body, the sheet upper edge portion coupled to the panel leading edge portion;

at least one panel actuator configured to move the at least one rigid panel between a stowed position and a deployed position;

in the stowed position, the at least one rigid panel being proximate the vehicle body and covering the at least one flexible sheet in a folded state between the at least one rigid panel and the vehicle body; and in the deployed position, the panel leading edge portion being moved away from the vehicle body and the at least one flexible sheet being in an open state exposable to an oncoming airflow relative to a forward-moving direction of the vehicle for generating aerodynamic drag for slowing the vehicle.

2. The aerodynamic brake of claim 1, wherein:
the at least one flexible sheet is a fiber-reinforced fabric.

3. The aerodynamic brake of claim 1, wherein:
the at least one flexible sheet includes one or more battens extending along a spanwise direction of the at least one flexible sheet for increasing a spanwise stiffness of the at least one flexible sheet.

4. The aerodynamic brake of claim 1, wherein:
the at least one flexible sheet has a plurality of air cells and one or more air cell openings for inflating the air cells when the at least one flexible sheet is in the open state and subjected to the oncoming airflow.

5. The aerodynamic brake of claim 1, wherein:
the at least one rigid panel has a panel perimeter; and
the vehicle body has a recess having a recess perimeter sized and configured complementary to the at least one rigid panel for receiving the at least one rigid panel in the stowed position.

6. The aerodynamic brake of claim 1, wherein:
the panel actuator is a linear actuator coupled between the at least one rigid panel and the vehicle body.

7. The aerodynamic brake of claim 1, further including:
at least one panel leading edge securing mechanism configured to releasably couple the panel leading edge portion to the vehicle body when the at least one rigid panel is in the stowed position.

8. The aerodynamic brake of claim 7, wherein the panel leading edge securing mechanism is configured as one of:
a U-shaped channel included with the vehicle body and oriented in an aft-facing direction and configured to receive the panel leading edge portion when the at least one rigid panel is in the stowed position; and
one or more panel leading edge latches releasably securing the panel leading edge portion to the vehicle body when the at least one rigid panel is in the stowed position.

9. The aerodynamic brake of claim 1, further including:
at least one auxiliary actuator;
at least one mounting bracket having a mounting bracket body end and a mounting bracket panel end;
the mounting bracket body end pivotably coupled to the vehicle body for pivoting, via the at least one panel actuator, the mounting bracket, for moving the at least one rigid panel between the stowed position and the deployed position;
the at least one rigid panel pivotably coupled to the mounting bracket panel end; and
the at least one auxiliary actuator configured to pivot the at least one rigid panel about the mounting bracket panel end during at least one of the following:
when the at least one rigid panel is in the deployed position;
when the at least one rigid panel is moving from the stowed position to the deployed position; and
when the at least one rigid panel is moving from the deployed position to the stowed position.

10. The aerodynamic brake of claim 1, wherein:
the at least one rigid panel is comprised of a plurality of panel segments arranged side-by-side in a spanwise direction;
the at least one flexible sheet is comprised of a plurality of sheet segments respectively associated with the plurality of panel segments; and
the plurality of panel segments and the plurality of sheet segments collectively defining a plurality of brake segments each having at least one panel actuator configured to actuate a brake segment independent of the remaining ones of the plurality of brake segments.

11. An aircraft, comprising:
a pair of wings;
at least one aerodynamic brake mounted to a wing upper surface of each wing, each aerodynamic brake including:
at least one rigid panel having a panel leading edge portion;
at least one flexible sheet having a sheet lower edge portion and a sheet upper edge portion, the sheet lower edge portion coupled to the wing, the sheet upper edge portion coupled to the panel leading edge portion;
at least one panel actuator configured to move the at least one rigid panel between a stowed position and a deployed position;
in the stowed position, the at least one rigid panel being positioned proximate the wing and covering the at least one flexible sheet in a folded state between the at least one rigid panel and the wing; and
in the deployed position, the panel leading edge portion being moved away from the wing and the at least one flexible sheet being in an open state exposable to an oncoming airflow relative to a forward-moving direction of the aircraft for generating aerodynamic drag for slowing the aircraft.

12. A method of aerodynamically braking a vehicle, comprising:
moving the vehicle along a forward-moving direction causing an oncoming airflow to pass over a vehicle body;
deploying an aerodynamic brake from the vehicle body by performing the following:
moving, using a panel actuator, at least one rigid panel from a stowed position to a deployed position, the at least one rigid panel in the stowed position being proximate the vehicle body and covering at least one flexible sheet in a folded state having a sheet lower edge portion coupled to the vehicle body and a sheet upper edge portion coupled to a panel leading edge portion, the at least one rigid panel in the deployed position having the panel leading edge portion moved away from the vehicle body; and
transitioning, when moving the at least one rigid panel from the stowed position to the deployed position, the at least one flexible sheet from the folded state to an open state exposing the at least one flexible sheet to the oncoming airflow relative to the forward-moving direction of the vehicle; and
generating aerodynamic drag of the vehicle in response to deploying the aerodynamic brake.

13. The method of claim 12, further comprising stiffening the at least one flexible sheet in the open state using at least one of the following:

one or more battens extending along a spanwise direction of the at least one flexible sheet; and a plurality of air cells generally aligned with the forward-moving direction and having air cell openings for inflating the plurality of air cells when the at least one flexible sheet is in the open state and subjected to the oncoming airflow.

14. The method of claim 12, further comprising:

receiving the at least one rigid panel within a recess in the vehicle body when the at least one rigid panel is in the stowed position.

15. The method of claim 12, further including:

releasably securing, using at least one panel leading edge securing mechanism, the panel leading edge portion to the vehicle body when the at least one rigid panel is in the stowed position.

16. The method of claim 12, wherein moving the at least one rigid panel from the stowed position to the deployed position comprises:

pivoting, using the panel actuator, a mounting bracket about a mounting bracket body end coupled to the vehicle body, the mounting bracket supporting the at least one rigid panel.

17. The method of claim 16, wherein the at least one rigid panel is pivotably coupled to a mounting bracket panel end of the mounting bracket, the step of moving the at least one rigid panel from the stowed position to the deployed position further including:

pivoting, using an auxiliary actuator, the at least one rigid panel about the mounting bracket panel end while pivoting, using the panel actuator, the mounting bracket about the mounting bracket body end to perform at least one of the following:

disengaging the panel leading edge portion from the vehicle body prior to moving the at least one rigid panel from the stowed position to the deployed position; and re-engaging the panel leading edge portion to the vehicle body when moving the at least one rigid panel from the deployed position to the stowed position.

18. The method of claim 16, wherein the at least one rigid panel has a panel trailing edge portion, and the at least one rigid panel is pivotably coupled to a mounting bracket panel end of the mounting bracket, the method further including:

pivoting, using an auxiliary actuator when the at least one rigid panel is in the deployed position, the panel trailing edge portion upwardly away from the vehicle body and the panel leading edge portion downwardly toward the vehicle body; and moving, using the panel actuator, the at least one rigid panel toward the stowed position.

19. The method of claim 12, wherein the at least one rigid panel is comprised of a plurality of panel segments arranged side-by-side in a spanwise direction, the at least one flexible sheet is comprised of a plurality of sheet segments respectively associated with the plurality of panel segments, the plurality of panel segments and the plurality of sheet segments collectively defining a plurality of brake segments each having at least one panel actuator, the step of deploying the aerodynamic brake comprising:

deploying at least one of the plurality of brake segments independent of deployment of the remaining ones of the plurality of brake segments.

20. The method of claim 12, wherein the step of moving the vehicle along the forward-moving direction and the step of deploying the aerodynamic brake from the vehicle body respectively comprise:

performing a landing in an aircraft having a pair of wings and a main landing gear; and deploying at least one aerodynamic brake from at least one of the pair of wings during at least a portion of the landing.

* * * * *